United States Patent
Bailey et al.

(10) Patent No.: US 6,785,671 B1
(45) Date of Patent: Aug. 31, 2004

(54) SYSTEM AND METHOD FOR LOCATING WEB-BASED PRODUCT OFFERINGS

(75) Inventors: David R. Bailey, Lake Forest Park, WA (US); Todd J. Feldman, Seattle, WA (US); Anand Rajaraman, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/528,138

(22) Filed: Mar. 17, 2000

Related U.S. Application Data

(60) Provisional application No. 60/169,570, filed on Dec. 8, 1999.

(51) Int. Cl.[7] .............................................. G06F 17/30
(52) U.S. Cl. ....................... 707/3; 707/2; 707/4; 707/5; 707/6; 707/10; 705/5; 705/14; 705/26
(58) Field of Search ........................... 707/2, 4, 5, 100, 707/523, 3, 6, 10; 705/14, 26, 27, 5; 709/223, 228, 203, 219; 704/10; 713/171

(56) References Cited

U.S. PATENT DOCUMENTS

| | | | |
|---|---|---|---|
| 5,640,553 A | | 6/1997 | Schultz ........................... 707/5 |
| 5,675,819 A | | 10/1997 | Schuetze ...................... 704/10 |
| 5,848,396 A | | 12/1998 | Gerace ......................... 705/10 |
| 5,895,454 A | | 4/1999 | Harrington .................... 705/26 |
| 5,913,210 A | * | 6/1999 | Call ............................... 707/4 |
| 5,918,214 A | | 6/1999 | Perkowski .................... 705/27 |
| 5,960,429 A | * | 9/1999 | Peercy et al. .................. 707/5 |
| 6,006,218 A | * | 12/1999 | Breese et al. .................. 707/3 |
| 6,009,459 A | | 12/1999 | Belfiore et al. ............. 709/203 |
| 6,014,664 A | | 1/2000 | Fagin et al. ..................... 707/5 |
| 6,064,979 A | * | 5/2000 | Perkowski .................... 705/26 |
| 6,064,980 A | * | 5/2000 | Jacobi et al. ................. 705/26 |
| 6,073,135 A | | 6/2000 | Broder et al. ............... 707/100 |
| 6,125,395 A | | 9/2000 | Rosenberg et al. ......... 709/228 |
| 6,144,958 A | * | 11/2000 | Ortega et al. ................... 707/5 |
| 6,182,050 B1 | | 1/2001 | Ballard ......................... 705/14 |
| 6,230,153 B1 | * | 5/2001 | Howard et al. ................ 707/2 |
| 6,247,130 B1 | * | 6/2001 | Fritsch ....................... 713/171 |
| 6,266,649 B1 | * | 7/2001 | Linden et al. ................ 705/26 |
| 6,401,118 B1 | * | 6/2002 | Thomas ..................... 709/224 |
| 6,405,175 B1 | * | 6/2002 | Ng ............................... 705/14 |
| 6,415,320 B1 | * | 7/2002 | Hess et al. .................. 709/219 |
| 6,418,434 B1 | * | 7/2002 | Johnson et al. ................ 707/5 |
| 6,421,675 B1 | * | 7/2002 | Ryan et al. ................. 707/100 |
| 6,460,072 B1 | * | 10/2002 | Arnold et al. .............. 709/203 |
| 6,484,149 B1 | * | 11/2002 | Jammes et al. .............. 705/26 |
| 6,535,896 B2 | * | 3/2003 | Britton et al. .............. 707/523 |

FOREIGN PATENT DOCUMENTS

GB   2 331 166 A   12/1999

OTHER PUBLICATIONS

Kim et al., "Intelligent Information Recommend system on the Internet", IEEE, 1999, pp. 1–5.*

Seki et al., "User's behavior and URL analysis at EC sites", IEEE, Oct. 1999, pp. 87–92.*

(List continued on next page.)

*Primary Examiner*—Thuy N. Pardo
(74) *Attorney, Agent, or Firm*—Knobbe, Martens, Olson & Bear LLP

(57) ABSTRACT

A search engine system assists users in locating web pages from which user-specified products can be purchased. Web pages located by a crawler program are scored, based on a set of rules, according to likelihood of including an online product offering. A query server accesses an index of the scored web pages to locate pages that are both responsive to a user's search query and likely to include a product offering. In one embodiment, the responsive web pages are listed on a composite search results page together with products that satisfy the query.

28 Claims, 9 Drawing Sheets

OTHER PUBLICATIONS

K. Matsuda and T. Fukushima, "*Task–Oriented World Wide Web Retrieval by Document Type Classification,*" Proceedings of the Eighth International Conference on Information Knowledge Management, pp. 109–113 (Nov. 1999).

International Search Report for PCT/US00/42645.

E. Voorhees, N. Gupta and B. Johnson–Laird, *Learning Collection Fusion Strategies,* SIGIR'95, ACM 0–89791–714, pp. 172–179, dated Jun. 1995.

B. Bartell, G. Cottrell and R. Belew, *Automatic Combination of Multiple Ranked Retrieval Systems,* Proceedings of the Twelfth International Conference on Machine Learning, pp. 173–181, dated Jul. 9–12, 1995.

G. Towell, E. Voorhees, N. Gupta and Ben Johnson–Laird, *Learning Collection Fusion Strategies for Information Retrieval,* SIGIR'95, Proceedings of the 18th Annual International ACM SIGIR Conference on Research and Development in Information Retrieval, pp. 540–548, dated Jul. 1995.

P. Foltz and S. Dumais, *Personalized Information Delivery: An Analysis of Information Filtering Methods,* Communications of the ACM, 35(12), pp. 51–60, dated 1992.

L. Magid, *Swiping Shoppers,* UPSIDE today, 2 pages, dated Oct. 21, 1999.

M. Roscheisen, C. Mogensen and T. Winograd, *Beyond browsing: shared comments, SOAPs, trails, and on–line communities,* Computer Networks and ISDN Systems 27, pp. 739–749, dated 1995.

R. Doorenbos, O. Etzioni and D. Weld, *A Scalable Comparison–Shopping Agent for the World–Wide Web,* ACM Press, Proceedings of the First International Conference on Autonomous Agents, pp. 39–48, dated Feb. 5–8, 1997.

A. Wexelblat and P. Maes, *Footprints: History–Rich Tools for Information Foraging,* CHI'99, pp. 270–277, dated May 1999.

P. Lewis, *Searching For Less, Not More,* New York Times, 2 pages, dated Sep. 30, 1999.

P. Maes, R. Guttman and A. Moukas, *Agents that Buy and Sell,* Communications of the ACM, vol. 42, No. 3, pp. 81–91, dated Mar. 1999.

\* cited by examiner

SYSTEM AND METHOD FOR LOCATING WEB-BASED PRODUCT OFFERINGS

RELATED APPLICATIONS

This application claims the benefit of U.S. Provisional Application No. 60/169,570, filed Dec. 8, 1999, now expired, the disclosure of which is hereby incorporated by reference. This application is being filed concurrently with an application titled SYSTEM AND METHOD FOR DISPLAYING MULTIPLE-CATEGORY SEARCH RESULTS which shares the same disclosure.

APPENDICES

This specification includes a computer program listing appendix consisting of Appendices A, B, C and D, which are stored on CD-ROM as the following files, respectively: Appendix_A.txt (13.4 Kbytes), Appendix_B.txt (17.2 Kbytes), Appendix_C.txt (8.16 Kbytes), and Appendix_D.txt (15.2 Kbytes), all created on Aug. 22, 2001. These files, which are incorporated herein by reference, contain a partial source code listing of one aspect of a preferred embodiment of the invention. The copyright owner has no objection to the reproduction of this code listing as part of this patent document, but reserves all other copyrights whatsoever.

FIELD OF THE INVENTION

The present invention relates to the field of search engines. More specifically, the invention relates to techniques for facilitating viewing search results that span multiple item categories, and for locating web pages that include offerings for products and other types of items.

BACKGROUND OF THE INVENTION

In the field of electronic commerce, it is common for online merchants to sell products within many different product-related categories. For example, Amazon.com, Inc., the assignee of the present application, sells products within the categories of books, music, video & DVD, toys & games, electronics, home improvement, and auctions. The predefined categories and associated products are typically presented to users in the form of a browse tree. In addition, many merchants provide a search engine for conducting searches for products.

One problem, commonly encountered by online merchants is the inability to effectively present groups of related products that span the predefined categories. Due to the large number of products and categories, and the organization of the web site, many relationships between products may be difficult for the user to ascertain. For example, suppose a user of a merchant's web site is a fan of the American humorist and author Mark Twain. The user may choose to look for books written by Mark Twain through a browse tree in the book section of an on-line commerce web site. Browsing in this manner is likely to reveal a large number of books authored by, or written about, Mark Twain. The user, however, may be unaware that the web site also sells products other than books that may be of interest to fans of Mark Twain. For example, a videos section of the same web site may contain video biographies of Mark Twain and video adaptations of many of his classic books, while a music section may include compact discs with songs inspired by his writings. Similarly, an auctions section of the same site may contain products offered for sale by third parties that may be of interest to the user, such as Mark Twain memorabilia. Although use of the web site's search engine may reveal some of these additional products, the user typically must review a long list of search results in order to identify the products or categories of interest.

Another problem in the field of on-line commerce is that of locating a web site from which a particular product can be purchased. This problem may arise, for example, when the online merchants known to the consumer do not carry the product of interest. In such a circumstance the consumer may use an Internet search engine such as ALTAVISTA or EXCITE to search for a web site that sells the product. The scope of such a general search is often large enough, however, that only a small fraction of a large number of located web sites actually offer the product for sale. For example, the search may include a relatively large number of sites that merely provide reviews, technical support, specifications, or other information about the product of interest. Thus the sites of greatest interest to the consumer are likely to be buried deep within a long list.

The present invention seeks to overcome these and other problems.

SUMMARY OF THE INVENTION

The present invention provides various features for assisting users in conducting online searches. The features may be embodied alone or in combination within a search engine of an online merchant, an Internet search engine, or another type of search system.

One feature of the invention involves a method for displaying the results of a multiple-category search according to levels of significance of the categories to a user's search query. The method can be used to display the results of a search for products or for any other type of item. In a preferred embodiment, the method involves receiving a search query from a user and identifying, within each of multiple item categories, a set of items that satisfy the query. The sets of items are then used to generate, for each of the multiple categories, a score that indicates a level significance or relevance of the category to the search. The scores may be based, for example, on the number of hits (items satisfying the query) within each category relative to the total number of items in that category, the popularity levels of items that satisfy the query, or a combination thereof.

The categories and associated items are then presented to the user in a display order that depends upon the scores—preferably from highest-to-lowest significance. Other significance criteria, such as a category preference profile of the user, may additionally be used to select the display order. In addition, other display methods for highlighting the most highly ranked categories may additionally or alternatively be used. The method increases the likelihood that the categories that are of most interest to the user will be presented near the top of the search results listing, or otherwise called to the attention of the user. To assist the user in efficiently viewing a cross section of the located items and their categories, no more that N items (e.g., the most highly ranked three items) within each category are preferably displayed on the initial search results page.

Another feature of the invention involves a system and methods for assisting users in locating web sites or pages from which user-specified products can be purchased. In a preferred embodiment, each web page located by a crawler program is initially evaluated, according to a set of content-based rules, to generate a score that indicates a likelihood that the web page includes a product offering. The scores may additionally be based on other criteria, such as the content of other web pages of the same web site. Representations of some or all of the scored web pages are stored in a keyword index that maps keywords to addresses (URLs) of the web pages. The keyword index is used by a query server to locate web pages that are both relevant to a user's search query and likely to include a product offering. This may be accomplished, for example, by limiting a scope of the search to web pages having a score that satisfies a particular threshold.

In one embodiment, the above-described features are embodied in combination within a search engine of a host merchant's web site. From this web site, a user can initiate an "All Products" type search that spans multiple product categories. The submitted search query is used to identify a set of products that satisfy the query, and a set of web pages that both satisfy the query and that have been determined to likely include product offerings. The results of the search are presented using a composite web page which lists at least some of the located products and at least some of the located web pages. The products are preferably displayed in conjunction with their respective product categories according to the above-described category ranking and display method.

BRIEF DESCRIPTION OF THE FIGURES

These and other features and advantages of the invention will now be described with reference to the drawings of certain preferred embodiments, which are intended to illustrate and not to limit the invention, and in which.

DETAILED DESCRIPTION OF THE PREFERRED EMBODIMENTS

One feature of the present invention involves a method for identifying and displaying product information derived from multiple product categories to a user in response to a query submitted to a search engine by the user. Another feature of the invention involves methods for users to search for web pages from which particular products can be purchased. In the preferred embodiment, these two features are embodied within a common search engine system; as will be apparent, these and other features of the invention can be used independently of one another and may therefore be considered as distinct inventions. For convenience of description, however, the term "invention" is used herein to refer collectively to the various inventive features disclosed.

A preferred embodiment and implementation of the invention will now be described with reference to the drawings. The description will reference various details of the invention in the context of AMAZON.COM's web site. These details are set forth in order to illustrate, and not to limit, the invention. The scope of the invention is defined only by the appended claims.

A. Overview of Web Site and Search Engine

Figure 1:
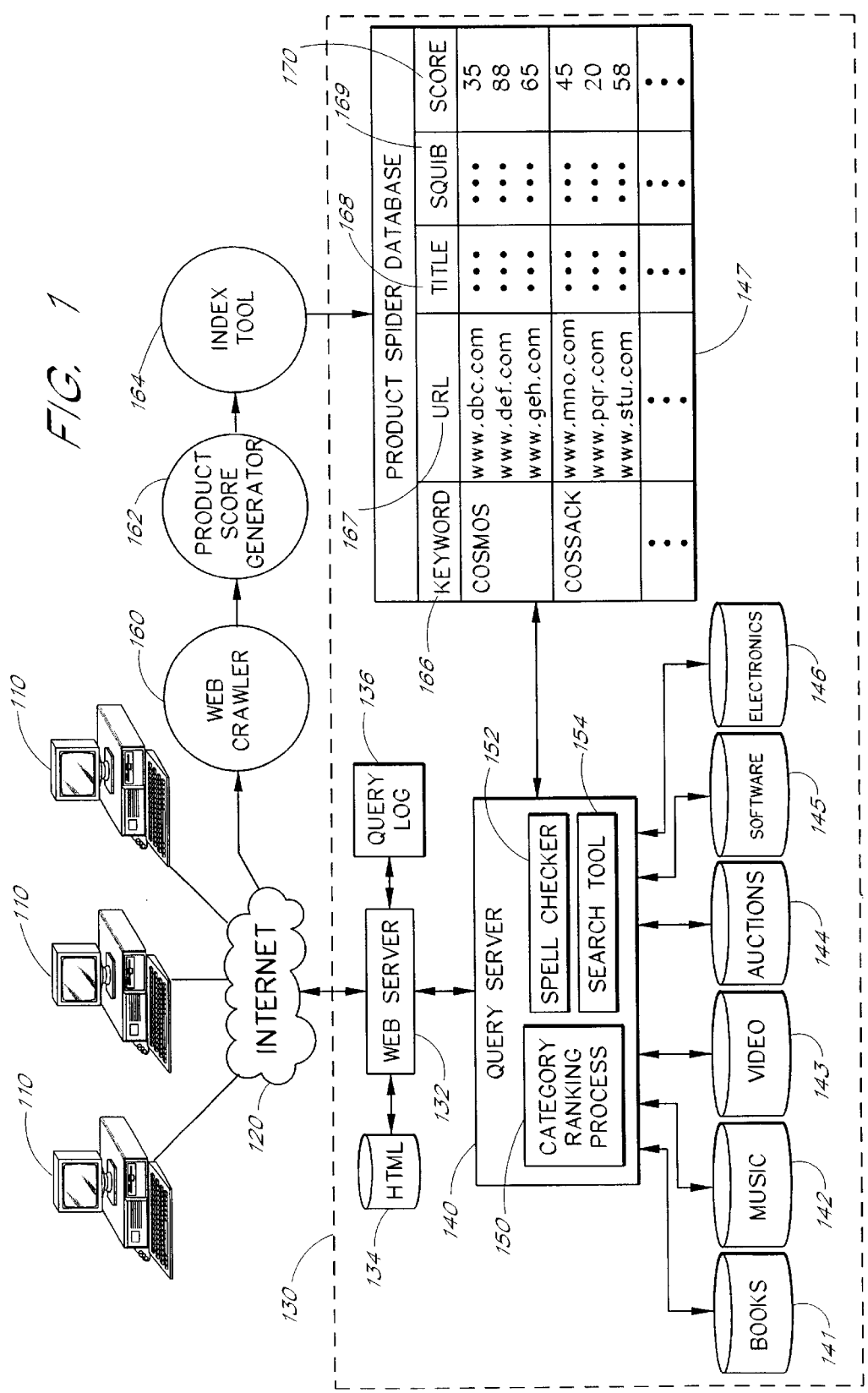
FIG. 1 illustrates a system in which users access web site information via the Internet, and illustrates the basic web site components used to implement a search engine that operates in accordance with the present invention.

FIG. 1 illustrates the AMAZON.COM web site 130, including components used to implement a search engine in accordance with the invention. As is well known in the art of Internet commerce, the AMAZON.COM web site includes functionality for allowing users to search, browse, and make purchases from an on-line catalog of book titles, music titles, and other types of items via the Internet 120. Because the catalog contains millions of items, it is important that the site provide an efficient mechanism for assisting users in locating items.

As shown in FIG. 1, the web site 130 includes a web server application 132 ("web server") that processes user requests received from user computers 110 via the Internet 120. These requests include queries submitted by users to search the on-line catalog for products. The web server 132 records the user transactions, including query submissions, within a query log 136.

The web site also includes a query server 140 that processes queries by searching a number of databases 141–147. The Books database 141, Music database 142, and Videos database 143, include product identifiers for books, musical products, and multimedia products, respectively, that users may purchase directly from the web site 130. The AMAZON.COM web site includes other categories of products sold directly through the web site, such as Electronics and Toys & Games, that are omitted from FIG. 1 in the interest of clarity. The Books, Music, and Videos databases 141–143 are intended to represent all databases within the web site 130 associated with products marketed directly by the web site merchant.

The Auctions database 144 of FIG. 1 includes information about third party on-line auctions hosted by the web site 130. The AMAZON.COM web site also hosts fixed-price third party offerings, known as "zShops," corresponding to a version of an on-line "flea market." The zShops category contains a database analogous to the Auctions database 144 that is omitted from FIG. 1 in the interest of clarity. The Auctions database 144 in FIG. 1 is intended to represent all databases within the web site 130 associated with hosting third party transactions.

The Affiliated Merchant databases labeled Software 145 and Electronics 146 include information about software and electronics products, respectively, that are offered for sale on independent web sites affiliated with the host web site 130. The AMAZON.COM web site includes other categories of products sold on independent affiliated web sites, such as Sports & Outdoors and Toys & Games, that are omitted from FIG. 1 in the interest of clarity. The Software and Electronics databases 145, 146 are intended to represent all databases associated with products sold by independent web site merchants affiliated with the web site 130.

The Product Spider database 147 includes information about independent web sites, unaffiliated with the host web site 130, that have been identified as offering products for sale. This database is particularly useful in that it allows the host web-site 130 to help a consumer find product offerings for products that are not sold by the host web site 130 or by affiliated on-line merchants.

Each of the databases 141–147 contain data tables indexed by keyword to facilitate searching in response to queries. For simplicity, the division of the product offerings into multiple databases will be referred to as separate "categories." For example, the Product Spider database 147 is one of seven categories displayed in FIG. 1.

The web site 130 also includes a database of HTML (Hypertext Markup Language) content that includes, among other things, product information pages that show and describe products associated with the web site 130.

The query server 140 includes a category ranking process 150 that prioritizes, by category, the results of searches across all of the various databases 141–147. The prioritization scheme is based upon an assessment of the significance of each category to the search query submitted by the user. The query server 140 also includes a spell checker 152 for detecting and correcting misspellings in search attempts, and a search tool 154 capable of generating search results from a database (e.g. the Books database 141) in response to a query submitted by a user. The search tool 154 prioritizes the items within a search result using different criteria depending upon the database used for the search. One approach, used for the Product Spider database 147, ranks the search result items through the well known "term frequency inverse document frequency" (TFIDF) approach, in which the weighting applied to each term of a multiple-term query is inversely related to the term's frequency of appearance in the database. In other words, the term in a query that appears least often in a database (e.g. the Product Spider database 147) is considered to be the most discriminating term in the query, and thus is given the greatest weight by the search tool 154. Algorithms for implementing this approach are well known and are commonly available in software development kits associated with commercial search engines such ALTAVISTA and EXCITE.

The Product Spider database 147 is generated through the use of a web crawler 160 that crawls web sites on the Internet 120 while storing copies of located web pages. The output of the web crawler 160 is input to a product score generator 162 that assigns a numerical score ("product score") to each web page based upon the likelihood that the page offers a product for sale for either online or offline purchase. For purposes of generating the score in the preferred embodiment, any type of item that can be purchased is considered a "product," including but not limited to physical goods, services, software, and downloadable content. In other embodiments, the products may be based on a more narrow definition of what constitutes a product. For example, by requiring or taking into account whether a web site includes information about shipping, non-physical items can be excluded from consideration or accorded a lesser weight. As depicted in FIG. 1, the product score 170 associated with each indexed web page is stored in the Product Spider Database 147. Alternatively, the web page entries could be grouped according to product score (e.g., top third, middle third, bottom third) without actually storing the score values. As a further refinement, the product scores could be generated and stored on a site-by-site basis rather than on a page-by-page basis.

Information within the web pages assessed by the product score generator 162 is extracted by an index tool 164 and stored into the Product Spider database 147. In some embodiments, only those web pages for which the product score exceeds a threshold value are indexed by the index tool 164. The index tool 164 is complimentary to the search tool 154 in that the index tool 164 outputs data in a fully text indexed database format that is searchable by the search tool 154. Any of a variety of commercially available search engine products, such as those available from ALTAVISTA and EXCITE, may be used to implement the index and search tools 164, 154.

As a variation to the above-described method, the index tool 164 could be configured to extract only those keywords that fall within a predefined distance (e.g., 10 words) of indicia of a product offering. This distance can be a fixed distance, or can be selected based on the type of indicia involved (dollar sign, manufacturer name, etc.). This variation would tend to produce a keyword index in which the keywords are associated with specific products. A similar approach can be used to generate the squib 169 ; for example, the squib could be generated by extracting sentences that immediately precede or follow some indicia of a product offering.

As noted above, the Product Spider database 147 is indexed by keyword 166. Each keyword in the database is associated with one or more web pages for which the indexer 164 has determined an association. For each keyword-web site combination, the database includes a URL ("uniform resource locator") address 168 for locating the web site, a short string of text (a "squib") 169 extracted from the web site, and a product score value 170 indicative of the likelihood that the web site offers a product for sale.

The Product Spider database 147 may include information beyond that shown in FIG. 1. Other types of information that may by stored include, for example, a product category (e.g., books, music, video, etc.) ascertained from parsing the web page (or a collection of pages), an age appropriateness indicator (e.g., products appropriate for adults only), a language indicator for the web site (English, Spanish, etc.), product reviews, whether the offers are for new or used products, and whether the products are available on-line, off-line, or both. Furthermore, in embodiments in which the web site 130 provides users an option to rate the located merchants (e.g., on a scale of 1–5), and to view the ratings entered by other users, the Product Spider Database 147 may store the merchant ratings data.

The web server 132, query server 140, category ranking process 150, and database software run on one or more UNIX-based servers and workstations (not shown) of the web site 130, although other platforms could be used. To accommodate a large number of users, the query server 140 and the databases 141–147 may be replicated across multiple machines. The web site components invoked during the searching process are collectively referred to herein as a "search engine." The web crawler 160 is preferably running continuously on one or more platforms (not shown) separate from the platforms used for the search engine. The product score generator 162 and indexer 164 preferably run on one or more platforms (not shown) separate from those used for the search engine and web crawler 160.

Figure 2:
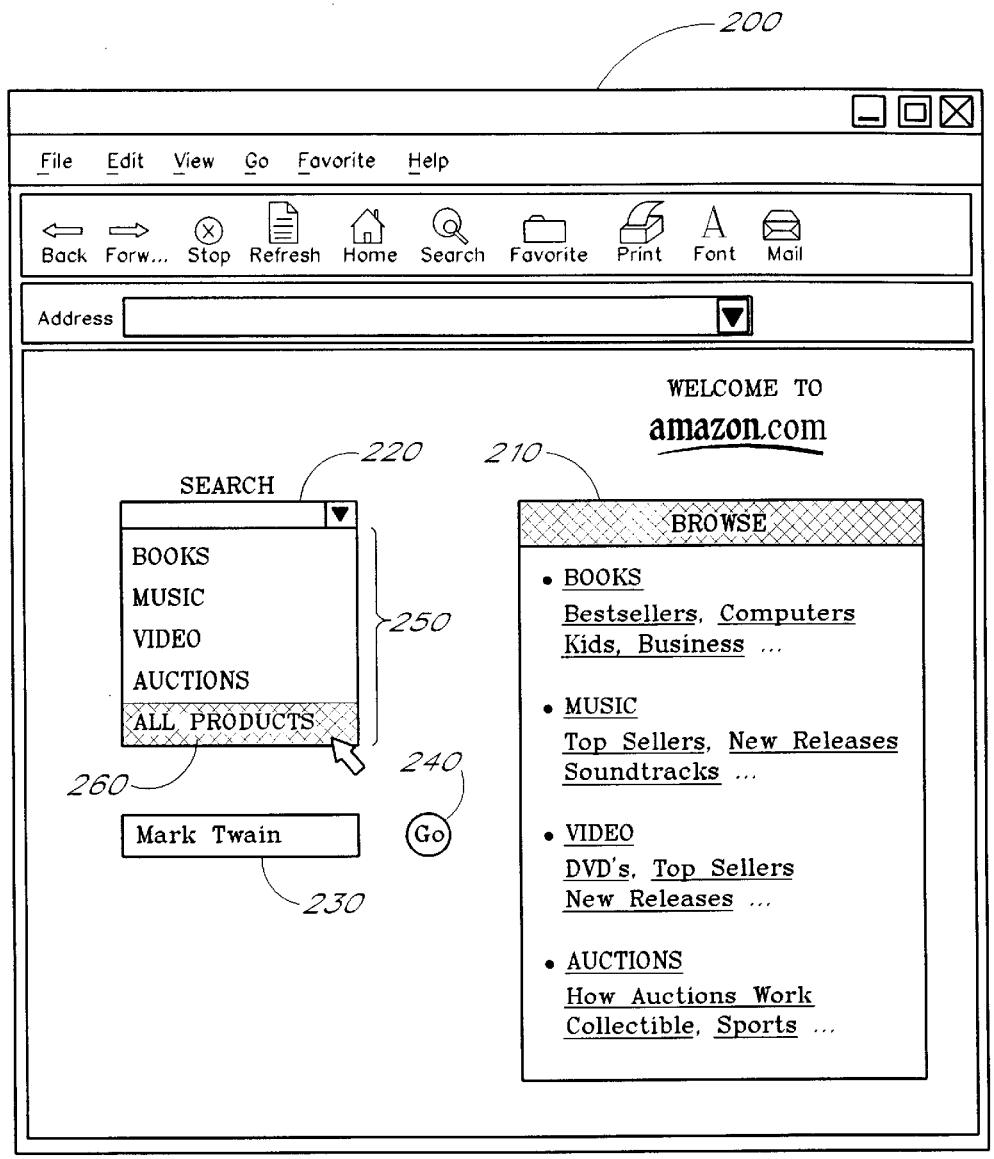
FIG. 2 illustrates a sample search tool interface page of the web site.

FIG. 2 illustrates the general format of a search tool interface page 200 of the host web site 130 that can be used to search for products. Users can pursue products using a browse tree interface 210 organized into predetermined categories such as books, music, videos, and auctions. Alternatively, users may search for products using a search engine interface 220. Users can perform searches with the search engine interface 220 by typing in the desired information (referred to herein as a "query") into a query window 230 and then clicking on a search initiation button 240. The user may control the scope of the search with a pulldown window 250 containing multiple categories. The search may be limited to any one category through selection of that category from the pulldown menu 250. Alternatively, the user may conduct a broad-based search through selection of an "All Products" option 260.

If the query is submitted to a single category, the search engine will present to the user a query results page (or multiple pages linked by hypertext, if the search finds a large number of items) containing a list of items matching the query. The search results page includes, for each item found, a hypertext link to additional web pages containing, among other things, product information about the item.

For multiple-term queries, the query server 140 effectively logically ANDs the query terms together to perform the search. For example, if the user enters the terms "Mark" and "Twain" into the query field 230 of FIG. 2, the query server 140 will search for and return a list of all items that are associated with both words.

If the search fails to find a single matching item, the search engine seeks to find misspellings within the query by submitting each query term to the spell checker 152. Any of a variety of types of spell checkers may be used for this purpose. In one embodiment, the spell checker 152 operates as described in U.S. application Ser. No. 09/115,662, filed Jul. 15, 1998, entitled "System and Method for Correcting Spelling Errors in Search Queries," which is hereby incorporated by reference. If the spell checker 152 determines that a term of the search query may be misspelled, a new term is substituted into the query and the query server 140 completes a new search with the modified query. In this situation the user is notified of the modification made to the query. If no results are found with the modified query, the user is presented with a "no results" page.

If no results are found that contain all of the query terms in a multiple-term query, the query server 140 performs searches on the individual terms of the query. In this situation the user is notified of the absence of exact matches, and is informed that the results merely represent close matches.

A more complete discussion of the processing of misspelled, or otherwise unusual, query terms is reserved until later with the help of FIG. 9.

When the user submits a query from the search engine interface 220 of FIG. 2 to the web site 130, the query server 140 applies the query to the database, or databases, corresponding to the search scope selected by the user. For example, if the user has selected the "Books" field from the pulldown menu 250, the query is only submitted to the Books database 141.

If the user has selected the "All Products" field 260 of FIG. 2 from the pulldown menu 250, the query server 140 applies the query to all of the product databases 141–147. The search tool 154 generates results independently from each of the databases 141–147.

Figure 3:
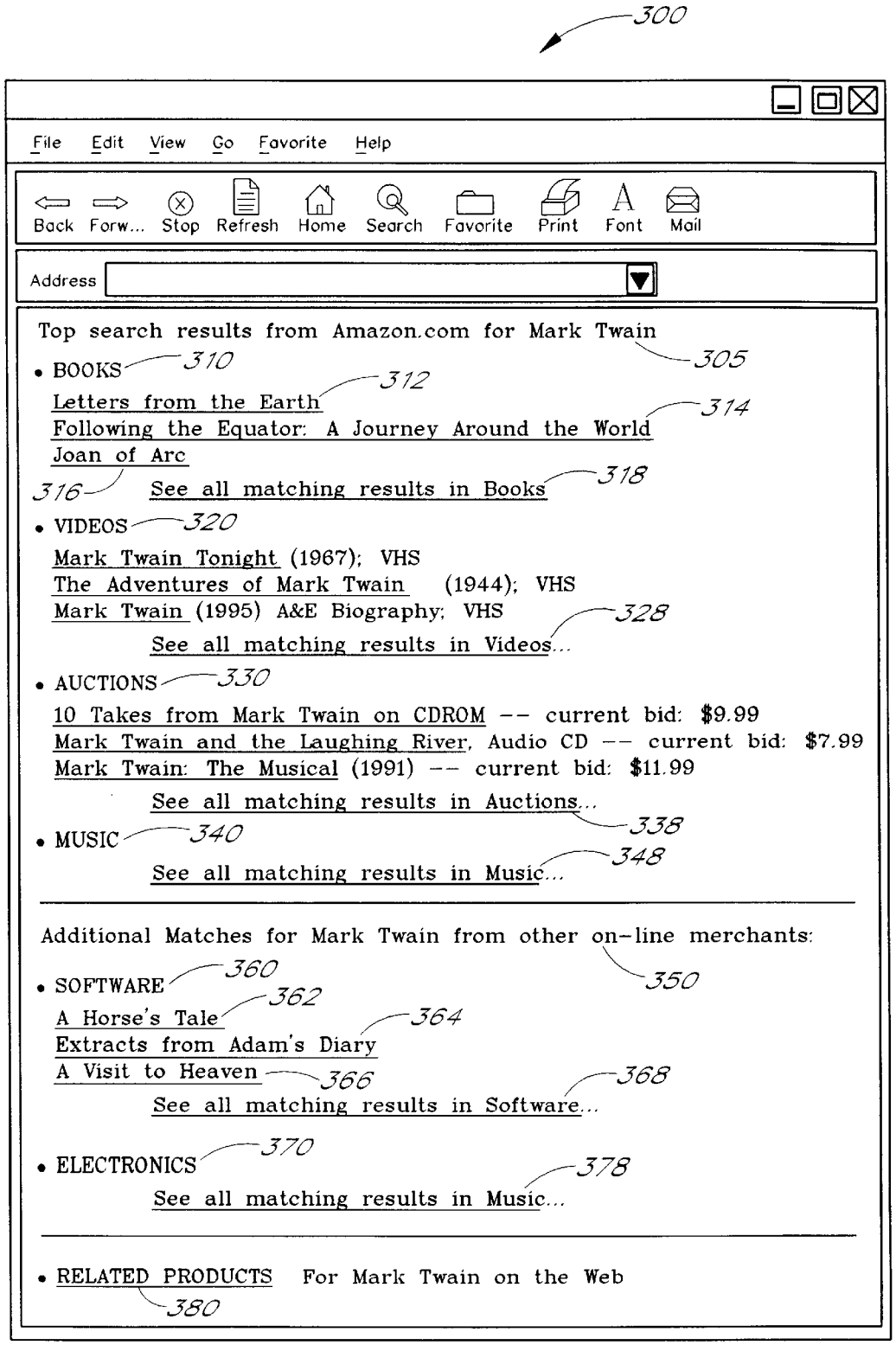
FIG. 3 illustrates a sample results page for an All Products search. The results include items directly offered for sale by the host merchant web site, items offered for sale by third parties using the host web site as a forum, items offered for sale by on-line merchants affiliated with the host merchant, and items offered for sale by on-line merchants unaffiliated with the host merchant.

FIG. 3 illustrates the general format of a search results page 300 of the AMAZON.COM web site 130 generated and displayed to the user in response to an "All Products" search on the query "Mark Twain." The results page 300 displays the search results in three separate sections: a "Top Search Results" section 305, an "Additional Matches" section 350, and a "Related Products" section 380.

As shown in FIG. 3, the most prominent (i.e. highest) section of the page displays the Top Search Results section 305. This section displays some result items generated from application of the query to the databases directly associated with the web site 130, that is, to the Books, Music, Videos, and Auctions databases 141–144. These results are depicted in FIG. 3 categorized under the Books 310, Videos 320, Auctions 330, and Music 340 headings, and represent products that are available for purchase from the host merchant. For these categories, as many as three items associated with each category are preferably displayed to the user. The matching search result items displayed on the All Products search results page 300 are referred to as "top-level" search result items. For example, the top-level items listed under Books 310 are entitled "Letters From the Earth" 312, "Following the Equator: A Journey Around the World" 314, and "Joan of Arc" 316. Each top-level listing includes a hypertext link to product detail pages including information about the associated item. Hypertext links (318, 328, 338, 348) providing access to lists of additional items within the respective categories that match the search query are provided for each category as well. These non-displayed additional items are referred to as "lower-level" search result items. The search tool 154 determines whether a matching item qualifies as a top-level, as opposed to bottom level, item using criteria that will be discussed later.

For the Music category 340, no top-level search result items are displayed on the All Products search results page 300 in the FIG. 3 example. Instead, only a link to lower-level items 338 is included. This format is used when the search tool 154 finds matches within a category, but none of the matches qualify as a top-level item.

In accordance with one feature of the invention, the display order of the categories within the Top Search Results section 305 is determined by the category ranking process 150, based upon an assessment of the likely relevance of each category to the search query. Thus, in FIG. 3, the category ranking process 150 determined that, for this particular search query, the Books category 310 was likely to be of greatest relevance to the user, followed by the Videos 320, Auctions 330, and Music 340 categories. An important benefit of this feature is that it reduces the need for users to view or scroll through search results that are not of interest. The manner in which relevance is assessed will be discussed later with the help of FIG. 8.

Although only four categories are depicted (for purposes of clarity) in FIGS. 1 and 3 for products directly associated with the web site 130, the AMAZON.COM web site includes a much larger number of categories that compete for priority within the Top Search Results section 305.

Immediately below the Top Search Results section 305, the All Products search results page 300 shown in FIG. 3 displays the Additional Matches section 350. This middle section displays the results generated from application of the query to the affiliated merchant databases, that is, to the Software and Electronics databases 145, 146. These results are categorized in FIG. 3 under the Software 360 and Electronics 370 headings. Within each category up to three items associated with that category are preferably displayed to the user. For example, in the Software category the items "A Horse's Tale" 362, "Extracts from Adam's Diary" 364, and "A Visit to Heaven" 366 are the top three matches as assessed by the search tool 154. As noted above, the search tool 154 assesses whether or not an item qualifies as a top-level item. Hypertext links (368, 378) to additional matches (i.e. lower-level items) are provided for the respective categories.

The Electronics heading 370 shown in FIG. 3, like the Music category 340 above, does not display top-level results, but instead includes a link to lower-level results. Again, this presentation is used when the search tool 154 finds matches within the category, but fails to find any matches qualifying for top-level status.

The order of the categories within the Additional Matches section 350 is determined by the category ranking process 150, based upon an assessment of the likely relevance of each category to the search query. Thus, in FIG. 3, the category ranking process 150 determined that, for this particular search query, the Software category 360 was likely to be of greater relevance to the user than the Electronics category 370. Although only two categories are depicted (for purposes of clarity) for the affiliated merchant databases in FIGS. 1 and 3, the AMAZON.COM web site includes a large number of categories that compete for priority within the Additional Matches section 350.

Immediately below the Additional Matches section 350, the results page displays the Related Products section 380. This section displays the search results generated from application of the query to the unaffiliated merchant database, that is, to the Product Spider database 147. In the preferred embodiment, no top-level results are displayed for this category. Instead, the results are accessible from the All Products search results page 300 via a hypertext link labeled "Related Products" 380. The search of the Product Spider database 147 preferably does not take place simultaneously with the searches of the other databases 141–146. Rather, the Product Spider search is initiated by the user's selection of the Related Products hypertext link 380, instead of by the user's selection of the search initiation button 240.

In another embodiment, the top three (or more) Product Spider results are displayed on the All Products results page 300 together with the categories in the Top Search Results and Additional Matches sections.

The display format of the All Products search results page illustrated in FIG. 3 allows a user to very efficiently identify all of the categories of products that are relevant to the query submitted by the user. This efficiency results in part from the limited number of items displayed to the user within each category.

Figure 4:
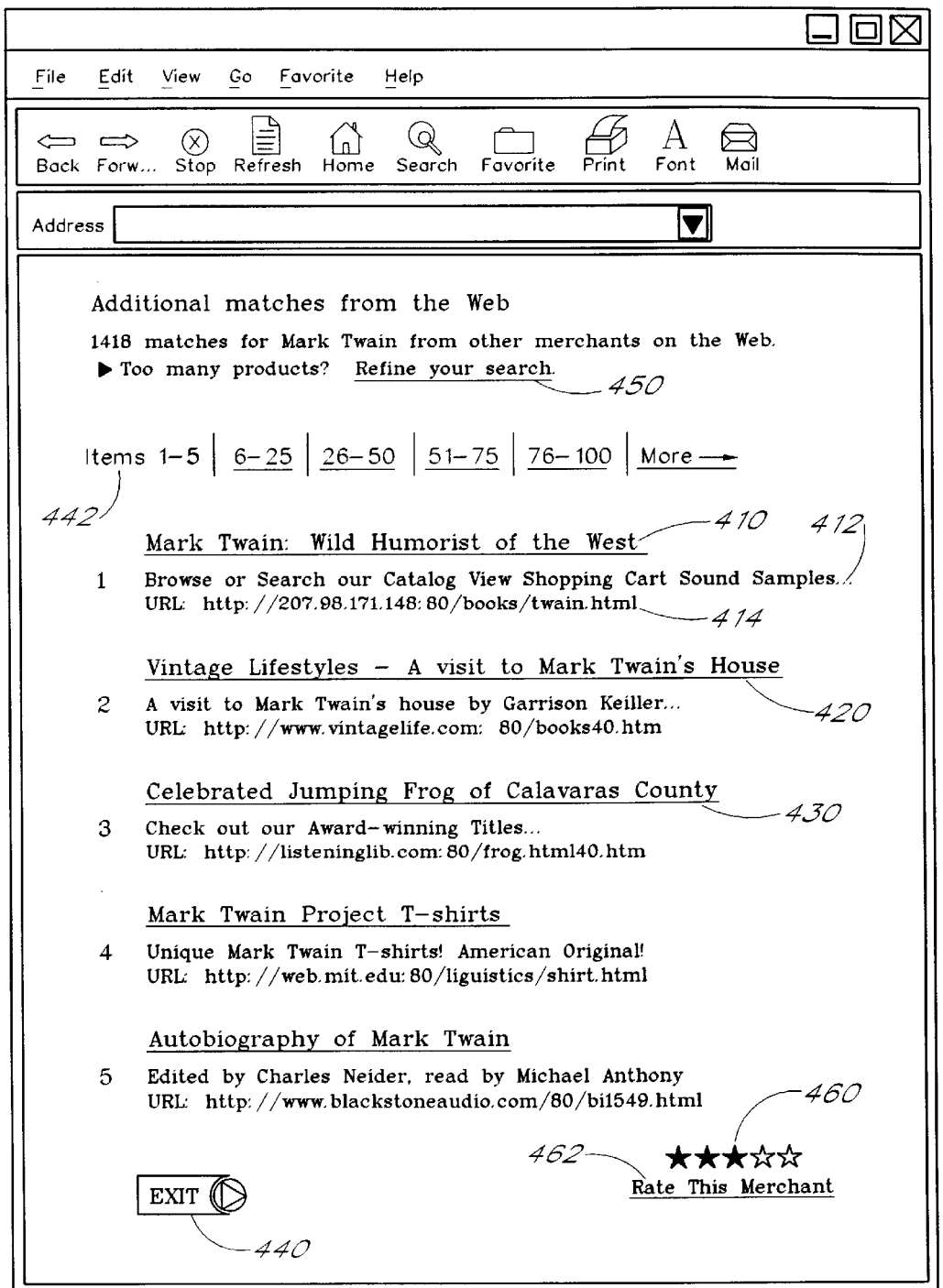
FIG. 4 illustrates a sample results page displaying "Related Products" items associated with on-line merchants who are unaffiliated with the host merchant web site.

FIG. 4 illustrates the general format of a Related Products search results page 400 generated in response to the selection of the Related Products hypertext link 380 in FIG. 3. The Product Spider results page 400 displays the query search result items found in the Spider database 147. The results are displayed as hypertext links in order of likelihood of relevance to the search query as assessed by the search tool 154.

As noted previously, the search tool 154 assesses the relevance of a multiple-term query to the Product Spider database 147 through inverse document frequency. That is, the weight given to a query term is inversely proportional to the frequency with which it appears in the database. For example, if a user enters the multiple-term query "Mark Twain" into the search engine query field 230, the term "Twain" is likely to appear far less than the term "Mark" in the Product Spider database 147. As such, when searching the database 147 the search tool 154 will give far greater weight to the term "Twain" when prioritizing the results for display to the user. The search tool 154 further prioritizes the results according to each query term's number of appearances, and location of appearance, within the web page. Appearances in the web page title are given the greatest priority; appearances in the first eight words of the body are given secondary priority; appearances in the subsequent thirty-two words of the body are given tertiary priority; and appearances in the remainder of the body are given lowest priority. This priority scheme, which is included with the search tool software developer's kit, is adjustable as needed.

Furthermore, as discussed below, the search tool 154 may use the product score values 170 (indicative of the likelihood that the corresponding web pages contain products available for purchase) stored in the Product Spider Database 147 to assist in the prioritization of the results generated from the Product Spider Database 147.

FIG. 4 indicates that applying the above rules to the Product Spider database 147 for the query "Mark Twain" provides five highest ranking results, the top three of which are entitled, "Mark Twain: Wild Humorist of the West" 410, "Vintage Lifestyles—A visit to Mark Twain's House" 420, and "Celebrated Jumping Frog of Calavaras County" 430. Each search result item includes a hypertext link to a web page of the unaffiliated merchant associated with the result. For example, selecting the top search result item takes the user to the unaffiliated merchant web site located at the URL: "http://207.98.171.148:80/books/twain.html" 414. Each search result item also includes a short squib 412 derived from the web page during the creation of the Product Spider database 147.

Since the number of matches found for a search query can be quite large, the results are generally partitioned so that only the top results are displayed on the first results page. In FIG. 4, for example, the first results page only displays the top five search result items. Typically the first page will display substantially more than five items. Matches with lower priority are displayed on additional Related Products results pages. These pages are accessible in sequential order via a "Next" button 440, or through a direct access link 442. Furthermore, the user may further refine the search by accessing a refinement link 450 that allows the submission of additional search query terms.

In one embodiment, the Product Spider results page 400 includes a rating 460 for one or more of the displayed result items. In FIG. 4, a rating (three out of five stars) is associated with the fifth result item (Autobiography of Mark Twain) based upon ratings provided by users who have previously interacted with this same on-line merchant. In one embodiment, the rating information is stored as an entry in the Product Spider database 147 (not shown in FIG. 1) corresponding to the on-line merchant's URL. In another embodiment, the rating information is stored in a separate "ratings" database, indexed by canonical URL. In these embodiments, the Product Spider results page 400 further includes an option, such as a hypertext link 462, for the user to rate the merchant. The option to rate the merchant preferably exists for every result item displayed on the Product Spider results page 400, and in all lower level results pages. FIG. 4 shows such an option for only one of the five merchants merely for the sake of clarity.

Additional details regarding the presentation of the Product Spider results page are provided below following the description of FIG. 5.

B. Method for Generating a Product Spider Database

Figure 5:
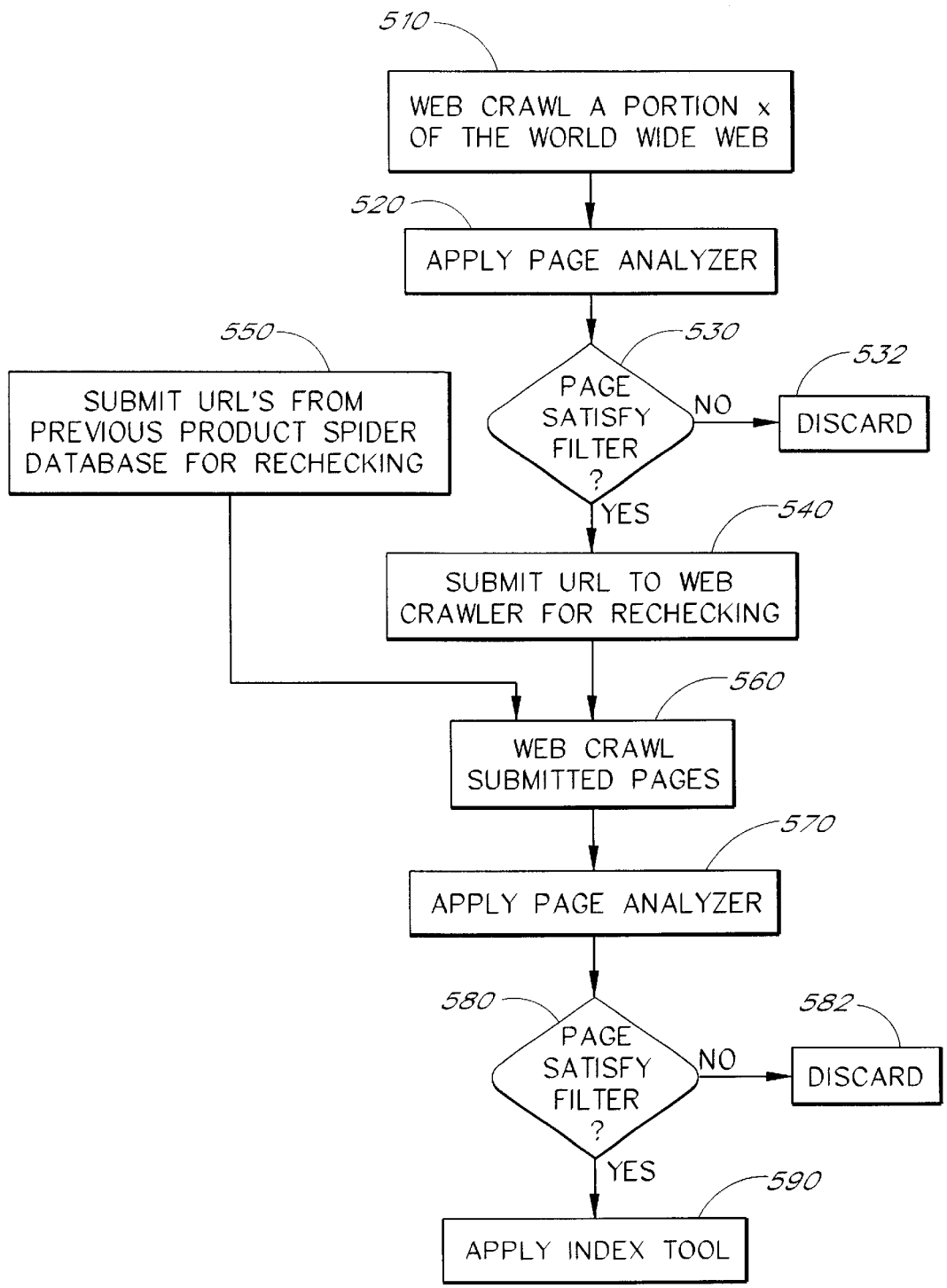
FIG. 5 illustrates the process used to generate the product spider database of FIG. 1.

FIG. 5 illustrates the sequence of steps that are performed to construct and refresh the Product Spider database 147. In step 510, the web crawler 160 crawls a fraction X of the World Wide Web. Web crawling programs, which attempt to locate all web pages accessible on the World Wide Web by following hypertext links, are well known in the art. The size of the fraction X of the World Wide Web that is crawled in step 510 depends upon the frequency with which the Product Spider database is refreshed. The World Wide Web presently contains a sufficiently large number of web pages so as to require an extended period of time for complete crawling. As such, if the Product Spider database 147 is refreshed frequently, only a fraction X of the World Wide Web is crawled between database updates.

As shown in FIG. 5, the web pages found through step 510 are passed through a page analyzing step 520 in which the non-content based characters of the web page HTML code (e.g., the typesetting characters, the hypertext link indicators, etc.) are removed. The remaining characters correspond to the text-based content of the web page. This content is passed to the product score generator 162 which generates a numerical score between 0 and 100 indicative of the likelihood that the source web page offers a product for sale. Scores of 0 and 100 indicate the smallest and largest likelihood, respectively, that the page is offering a product for sale. Loosely speaking, the product score may be thought of as a degree of confidence written as a percentage of absolute certainty.

The analysis is conducted on a page by page basis, with each web page being assessed independently. In an alternative embodiment, a target page may be assessed by analyzing, in addition to the content of the target page itself, the contents of other web pages linked to the target page. The analysis may be limited to "neighboring" web pages (i.e., web pages directly accessible via a link on the target page), or it may extend to encompass more remotely accessible web pages (i.e., web pages that are only accessible via a series of links). In these embodiments, the contributions of other web pages to the assessment of the target page may be weighted such that the influence of a remote page decreases with the number of links between the page and the target page, and/or such that only web pages of the same web site are considered.

In yet another embodiment, a web site may be analyzed as a single entity. The web site assessment may occur by combining the results of a page by page assessment of the web pages within the site, or it may occur by analyzing the web site as a whole.

The page analyzing step 520 also looks for character strings judged to be inappropriate for users of the host web site 130. For example, web sites identified as marketing salacious adult content are excluded from the Product Spider database 147.

1. Score Generation Process

To produce a product score, the product score generator 162 first generates a set of confidence parameters designed to assess the degree to which the content-based text of a web page suggests a product is being offered for sale. One confidence parameter, "HasOfferingPrice," quantifies the presence of character strings indicative of offering prices. To create the HasOfferingPrice parameter, the product score generator 162 parses the page contents looking for character strings indicative of currency, such as "$," "US$" (for prices in dollars), "£" (for prices in pounds), and "dm" (for prices in Deutschmarks) followed by a string of digits. The algorithm also looks for strings indicative of an offering price, such as "price is []," "price: []," "list: []," "regularly: []," "our price is []," "price including standard shipping is []," "cost is []," "on sale now at []," "on sale now for []," and "[] for one," where in each case the square brackets signify a currency indicator followed by a string of numbers. Each time a character string denotative of an offering price is found, the HasOfferingPrice parameter is incrementally increased through a "NoisyOr" operation with a weighting factor.

The NoisyOr operation is an analog variant of the binary OR operation, where NoisyOr(A,B)=A+B−(A×B), where A and B are between 0 and 1, inclusive. The properties of the NoisyOr operation are characterized in Table I, where a variable B ($0 \leq B \leq 1$) is NoisyOr'ed against select values of a parameter A ($0 \leq A \leq 1$).

TABLE I

| A | B | NoisyOr(A,B) |
|---|---|---|
| 1 | B | 1 |
| 3/4 | B | 3/4 + 1/4B |
| 1/2 | B | 1/2 + 1/2B |
| 1/4 | B | 1/4 + 3/4B |
| 0 | B | B |

If A=1, the output is 1 regardless of the value of B, as expected for an OR operation. If A=0, the output is B regardless of the value of B. For intermediate values of A, the output is A summed with a fraction of B. The resultant output is always equal to or larger than the larger of the two inputs, but never bigger than 1.

The weighting factor used for a particular text pattern for a particular confidence parameter within the NoisyOr operation depends upon the degree of confidence associated with the text pattern. Table II provides weighting factors, determined empirically, for the HasOfferingPrice parameter for some example text patterns. In Table II the parameters $H_{old}$ and $H_{new}$ refer to the HasOfferingPrice parameter before and after, respectively, the NoisyOr operation is applied.

TABLE II

| Text Pattern | Weighting | Resulting NoisyOr |
|---|---|---|
| "your price is [ ]" | 0.9 | $H_{new} = NoisyOr(H_{old}, 0.9)$ |
| "price: [ ] for one" | 0.6 | $H_{new} = NoisyOr(H_{old}, 0.6)$ |
| "price is [ ] per person" | 0.4 | $H_{new} = NoisyOr(H_{old}, 0.4)$ |
| "[ ]/person" | 0.2 | $H_{new} = NoisyOr(H_{old}, 0.2)$ |
| "[ ] for one" | 0.1 | $H_{new} = NoisyOr(H_{old}, 0.1)$ |

Inspection of Table II indicates that the character string "your price is []" is believed to be a very good predictor of web pages offering products for sale. The character string "[] for one," on the other hand, is believed to be a relatively weak predictor.

Other confidence parameters, analogous to HasOfferingPrice, are used to quantify a wide variety of character strings associated with product offerings, including the presence of warranty terms, sales tax information, shipping information, SKU numbers, shopping carts, and click-to-buy options. Each confidence parameter is incremented through the use of the NoisyOr operation and weighting factors in the same manner described above for the HasOfferingPrice parameter. The specific character strings and weighting factors used for the confidence parameters are disclosed in Appendices A, B and C.

The product score generator 162 combines the finished set of confidence parameters through a series of nested NoisyOr operations, again using empirical weighting factors, to generate a single product score for the page. The specific combinations and weighting factors used to generate the product score are disclosed in Appendix D.

2. Second Analysis Stage

In practice, the vast majority of the web pages on the World Wide Web are not associated with product offerings, and as such their corresponding product scores are low. As shown in FIG. 5, these web pages are excluded from the Product Spider database 147 by a filtering step 530. The filter is simply a threshold number, preferably thirty, that the web page product score must equal or exceed to satisfy the filter. Web pages having a product score below thirty are discarded 532 as inappropriate for the Product Spider database 147. Typically about 99% of all web pages in the World Wide Web are discarded in this manner. Those pages having product scores satisfying the filter criteria are retained. The corresponding URLs are submitted back 540 to the web crawler 160 for a second crawling stage 560.

In other embodiments, such as those in which the index is also used to provide a general purpose web search engine, pages may be indexed without regard to their respective product scores. In still other embodiments, the filter comprises multiple ranges of product score values with predetermined minimum and maximum values. For example, four separate databases may be created for web pages having product score values of 20–40, 40–60, 60–80, and 80–100, respectively. In these latter embodiments the product scores may optionally be omitted from the respective databases.

If the Product Spider database is not being constructed for the first time, but rather is being updated, then the URLs from the existing database 147 are submitted 550 to the second crawling stage 560 as well. Duplication between the previous database submissions 550 and the latest web crawl submissions 540 are detected and removed (not shown).

The second crawling stage 560 shown in FIG. 5 typically requires substantially less time than the first crawling stage 510, as the number of web pages involved is considerably smaller. The results of the second web crawling stage are passed through a second page analyzing stage 570, wherein product scores are generated anew. In a second filtering stage 580, pages failing to satisfy the filter are once again discarded 582. Those pages satisfying the second filtering stage 580 are passed in step 590 to the index tool 164 for further processing.

The second filtering stage 580 preferably uses the same criteria as the first filtering stage 530. In an alternative embodiment, the second filtering stage 580 may have either more or less discriminating criteria than the first filtering stage 530.

3. Construction of the Product Spider Database

The pages retained after the second filtering stage 580 shown in FIG. 5 are passed to an indexing stage 590 wherein the index tool 164 creates the Product Spider database 147, fully text indexed by keyword 166. A given web page will contain multiple index keywords distributed throughout its text. The index tool 164 converts the information from a form organized by URL into a form organized by keyword. Schematically, the index tool 164 reorganizes the set of multiple pages ($Page_m$, where m=1 to M) containing multiple Keywords ($Word_n$, where n=1 to N) such that $Page_1$ ($\Sigma_n Word_n$), $Page_2$ ($\Sigma_n Word_n$), . . . , $Page_M(\Sigma_n Word_n)$ is converted into $Word_1(\Sigma_m Page_m)$, $Word_2 (\Sigma_m Page_m)$, . . . , $Word_N(\Sigma_m Page_m)$.

As shown in FIG. 1, the database 147 includes, for each keyword 166, one or more web page addresses 167 with corresponding titles 168, squibs 169, and product scores 170. All of the product scores will necessarily equal or exceed thirty in the preferred embodiment due to the second filtering stage 580.

The web page addresses 167 stored in the Product Spider database 147 are preferably "canonicalized" URLs. URLs often include one or more strings of characters appended to the addressing information that specify, for example, a particular user ID, session ID, or transaction ID. These characters are not needed for accessing the web page, and are thus preferably discarded, resulting in a "canonical" URL for inclusion in the Product Spider database 147. Techniques for canonicalizing URLs are well known in the art.

The title 168 entry of the database 147 is preferably duplicated directly from the title used for the web page, as identified by the appropriate HTML tags. If a web page has an inappropriate title, or is missing a title, a new title is inserted into the database 147 as needed on a case by case basis.

The squib 169 entry of the database 148 is generated automatically by the index tool 164. The squib corresponds to the initial series of words on a web page, up to a preset number of characters set at about two-hundred. In another embodiment, the squib displays relevant text extracted from the web page corresponding to the products offered for sale on the web page.

The process illustrated in FIG. 5 may be used to update the Product Spider database 147 as often as desired. In a preferred embodiment, the Product Spider database 147 is updated every week, more preferably the database is updated every three or four days, and even more preferably it is updated every day.

As indicated above, the Product Spider database 147 may alternatively be constructed without storing the product scores for each page. In one embodiment, for example, the database comprises only pages having a product score satisfying predetermined criteria, for example, requiring the product score to equal or exceed thirty (as in the filtering steps 530, 580 of FIG. 5). In another alternative embodiment, the database comprises multiple indexed tables created without storing the product scores, wherein each table is constructed from web pages having a product score satisfying unique criteria, for example, four separate indexed tables containing pages having product scores from 20–40, 40 –60, 60–80 and 80–100, respectively.

In another embodiment, the Product Spider database 147 consists of multiple indexed tables, wherein each table is constructed from web pages that are distinguishable on the basis of some aspect of product offerings (ascertained from parsing the web pages) unrelated to product scores. In one embodiment, for example, the database 147 consists of separate tables for different categories of goods (e.g., books, music, videos, electronics, software, and toys). In another embodiment, a separate table is used for products unsuitable for children. In still another embodiment, different tables are constructed for web sites written in different languages (English, Japanese, German, etc.). In yet another embodiment, different tables are constructed for on-line and off-line product offerings. Under these embodiments, the page analyzer steps 520, 570 include searching for character strings judged to be associated with the various predefined categories.

By constructing the Product Spider database 147 out of different tables having distinguishing characteristics, or retaining the equivalent information within one big table, the user is capable of conducting a more refined search within the Product Spider database 147. In one embodiment, for example, the Related Products hypertext link 380 is replaced by a pulldown menu comprising different categories corresponding to the distinctions retained within the Product Spider database 147 (e.g., books, music, video, and toys categories, on-line versus off-line offerings, goods versus services, etc.).

The Related Products search results page 400 (FIG. 4) displays search results using TFIDF prioritization as applied to the entire Product Spider database 147. That is, the results consist of a single list drawn from all of the web pages satisfying the filtering steps 530, 580 of FIG. 5 (e.g., all web pages having product scores at or above 30). In another embodiment, the search results are presented as a number of lists, with each list having an independent TFIDF prioritization. In this embodiment, each of the multiple lists consists of pages satisfying different product score criteria. In one embodiment, these multiple lists are displayed separately. In an alternative embodiment, the lists are concatenated into one long list. This latter embodiment is illustrated in Table III, where an All Products search of the host web site 130 generates two Product Spider results lists, an "A" list for web pages having product scores at or above eighty, and a "B" list for web pages having product scores below eighty but at or above thirty. The A List is presented first (on multiple pages if it is long), and the B List is concatenated onto the end of the A List. This bifurcation attempts to provide the user first with those pages most likely to be offering a product for sale. The B list may optionally be generated only if the number of items in the A list falls below a threshold number, such as five, or if the user requests to view (e.g. via selection of a hypertext link) the B list.

TABLE III

| Lists | Criteria |
|---|---|
| A List | Product Score ≧ 80 |
| B List | 80 > Product Score ≧ 30 |

The Product Spider search feature has been discussed above in the context of a product-oriented search engine of an on-line merchant. The feature may be implemented in other contexts as well. It may be implemented, for example, as part of a "general purpose" web search engine as a user-selected option (e.g. through a pulldown menu or through selection of a "product offering" button).

C. Method for Ranking Categories in an All Products Search

As noted above, users of the AMAZON.COM web site 130 may conduct an All Products search that will generate results for items directly offered for sale by the AMAZON.COM web site (organized into multiple categories), items offered for sale by third parties (Auction and zShop users) using the Amazon web site as a forum, items offered for sale by other on-line merchants affiliated with AMAZON.COM (organized into multiple categories), and items offered for sale by on-line merchants unaffiliated with AMAZON.COM (those within the Product Spider database 147). With such a large number of categories involved, it is advantageous that the results of such a cross-category search be displayed efficiently. In particular, it is desirable that the search results of most relevance to the user be displayed so that the user does not need to wade through a long list of irrelevant search results or click through a long series of hypertext links to find the results of greatest interest.

Figure 6:
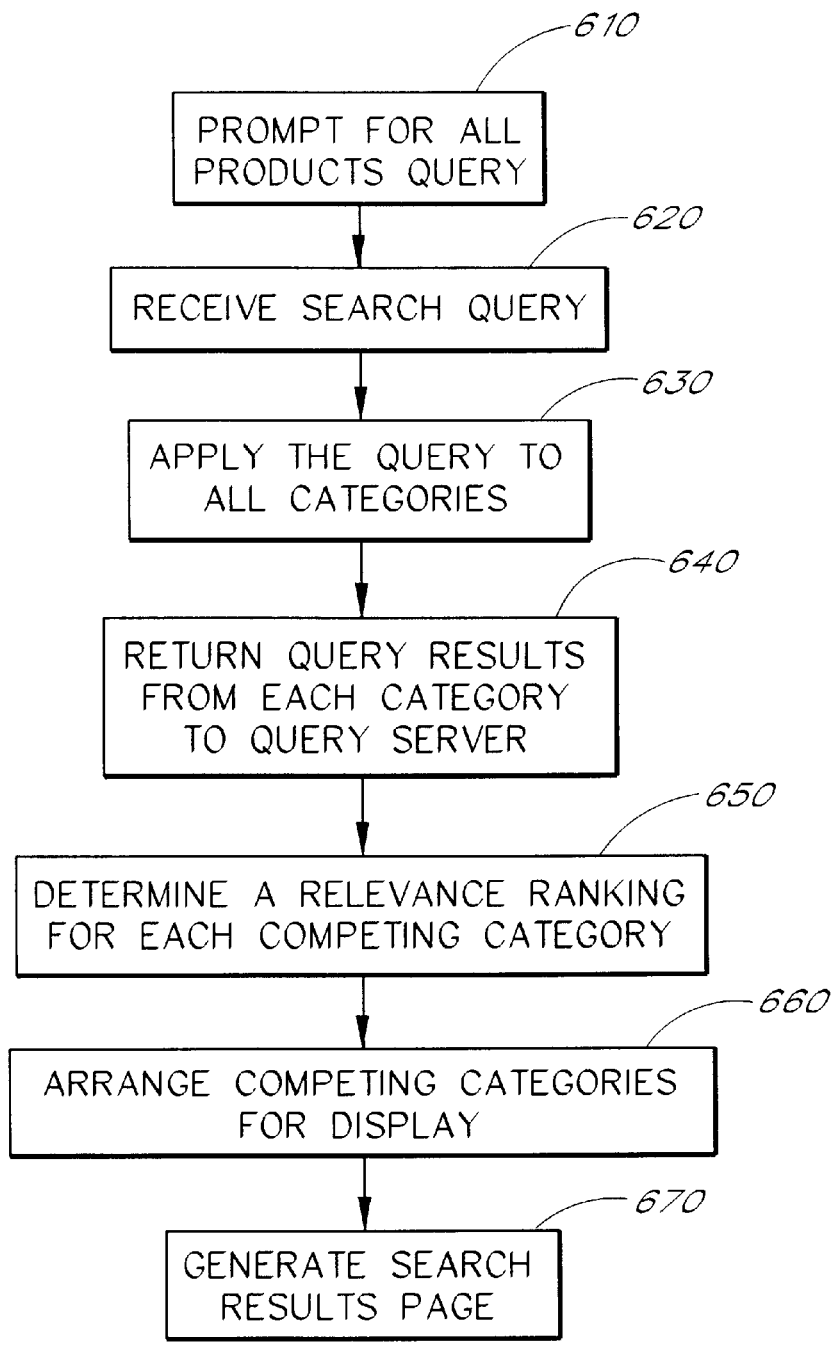
FIG. 6 illustrates the process used to generate a return page in response to an "All Products" search query.

FIG. 6 illustrates the sequence of steps that are performed to construct an All Products search results page such as depicted in FIG. 3. In a first step 610, the user is prompted to enter a search query to all of the products databases 141–147. One approach is illustrated in FIG. 2, where the user may select the All Products option 260 from the pulldown window 250.

In a second step 620 shown in FIG. 6, the user submits a search query to be applied to all of the product databases 141–147. One approach is illustrated in FIG. 2, where the user may enter a query into the query field 230 and select the search initiation button 240.

In a third step 630 shown in FIG. 6, the query is applied to all of the categories comprising the All Products search. As illustrated in FIG. 1, the query is submitted by the query server 140 via the search tool 154 to a separate database 141–147 associated with each category. Each product database 141–147 is indexed by keyword to facilitate searching by the search tool 154.

In a fourth step 640 shown in FIG. 6, the query results are returned from each of the product databases 141–147, via the search tool 154, to the query server 140. The search tool prioritizes the results within each category according to a determination of relevance based upon the query terms. The method used by the search tool 154 to prioritize the search result items within a category varies depending upon the nature of the category searched. The prioritization methods used are discussed at length below with the help of FIG. 7.

In a fifth step 650, a relevance ranking is generated for each competing category based on an assessment of the relevance of the search query to that category. The method used to generate the relevance ranking is discussed in more detail below with the help of FIG. 8.

In a sixth step 660, the categories are arranged in a display order determined by the results of the category relevance ranking step 650. The primary purpose of this step is to display the categories (and associated search results) deemed to be the most closely related to the search query near the top of the search results page. In a final step 670, a search results page having the appropriate arrangement is generated for display to the user. An example All Products search results page 300 is illustrated in FIG. 3. The approach discussed above displays to the user the top-level search results deemed to be of greatest interest to the user in a manner that is efficient (long lists are avoided), comprehensive (all pertinent categories are included, and links to further results are provided), and clear (the organization and prioritization helps the user quickly comprehend the results).

1. Prioritizing Search Result Items Within Each Category

The method used to prioritize the search result items within the Product Spider database 147 has already been discussed. Briefly, a database entry is given a higher priority depending upon the number of times a search term appears in the page. Appearances in the web page title, and in text near the beginning of the page, are given higher priority than later appearances. In multiple-term queries, the significance of each term is weighted in a manner inversely proportional to how frequently the term appears in the Product Spider database 147.

Search result items within the Auctions database 144 are prioritized based upon the ending time of the auction, with a shorter closing time receiving higher priority than a later closing time. The top-level Auctions result items displayed on the All Products search results page (see FIG. 3) correspond to the matching Auctions result items (preferably up to a maximum of three) having the most imminent ending times. Selecting the hypertext link to the lower-level matches 338 provides a list of all of the matching Auctions result items. These lower-level results may be sorted by the auction ending times, by the TFIDF relevancy of the search query, by the starting time of the auction, by the present number of bids, or by the highest present bid. The method of display of these lower-level results is preferably an option for the user (e.g. via a pulldown menu).

For databases associated with the AMAZON.COM zShops (fixed-price offerings by third parties—not shown in FIG. 1), the top-level search result items are prioritized in the same manner used for the Product Spider database 147, discussed above. Thus the zShops results displayed on an All Products search results page correspond to the zShops matching result items (preferably up to a maximum of three) having the highest TFIDF relevancy. Selecting an associated hypertext link to lower-level matches provides a list of all of the matching zShops result items. These lower-level results may be sorted by TFIDF relevancy, by the starting or ending date of the zShop, or by the product price. The method of display of these lower-level results is preferably an option for the user (e.g. via a pulldown menu).

For items within the categories of goods sold directly by the host web site (i.e. goods from the Books, Music, and Videos databases 141, 142, 143) or sold by affiliated merchants (i.e. goods from the Software and Electronics databases 145, 146) the results are prioritized using a more sophisticated approach than those discussed above. For these categories, the assessed relevance of a search result item is based upon the frequency with which the item has been selected in the past during similar queries. The manner in which this is accomplished is now discussed with reference to FIG. 7.

Figure 7:
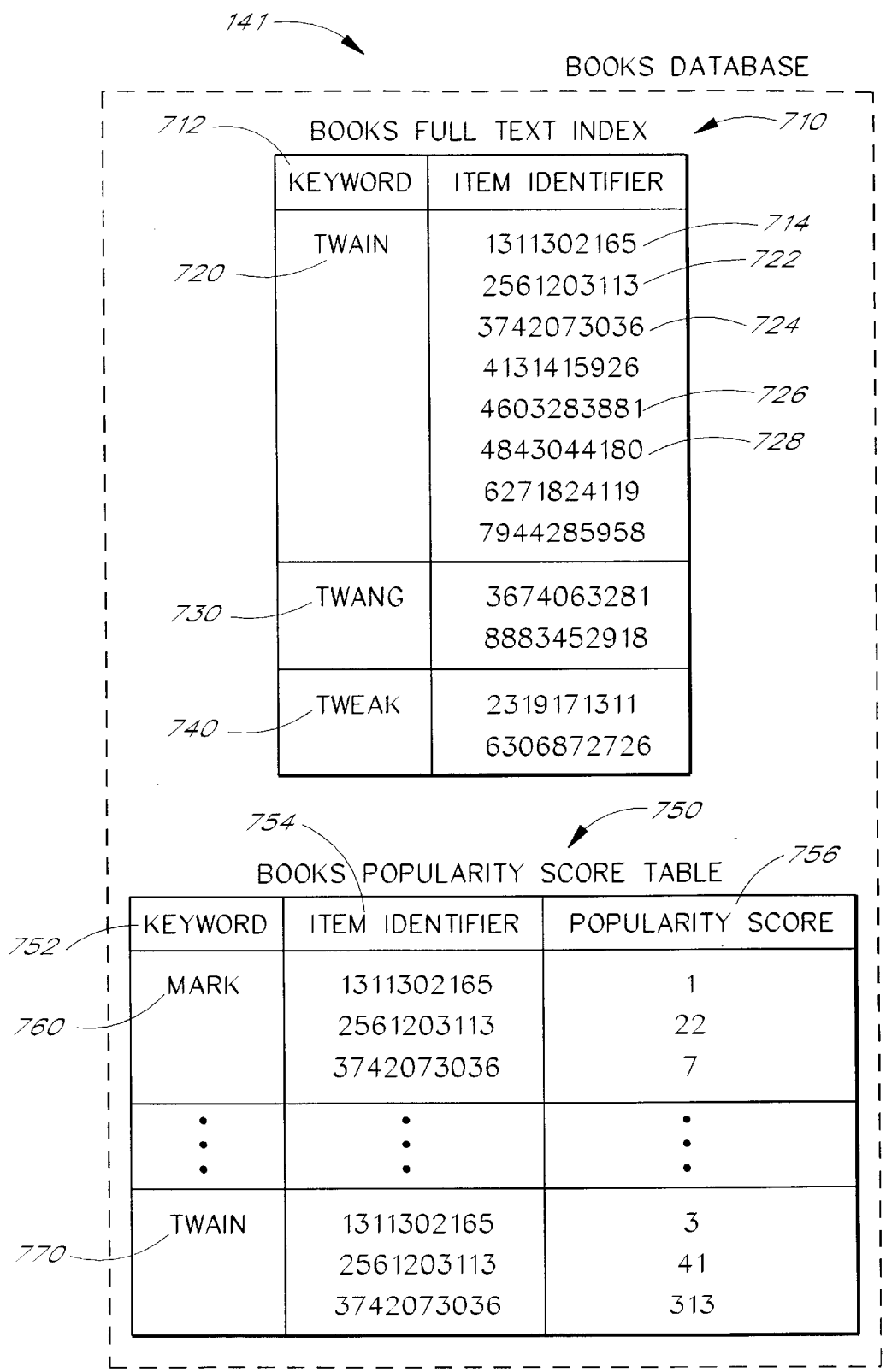
FIG. 7 illustrates the structure of the Books database of FIG. 1.

FIG. 7 illustrates the structure of the Books database 141 of FIG. 1. The database consists of two tables, a Books Full Text Index 710 and a Books Popularity Score Table 750. The Books Full Text Index 710 contains information, indexed by keyword, for every item in the Books catalog of the web site 130. The Books Popularity Score Table 750 contains information about the subset of books from the Books catalog that users of the web site 130 have recently "selected" during on-line searches.

The Books Full Text Index 710 is indexed by keyword 712 to facilitate searching by the search tool 154. The comprehensive indexing is created in a manner analogous to that discussed above for the Product Spider database. Briefly, the index tool 164 converts the information from a form organized by item into a form organized by keyword. Thus, for each keyword 712, the Books Full Text Index 710 contains one or more item identifiers 714 each of which uniquely identify a book within the on-line catalogue of the host web site 130.

The Books Full Text Index 710, for example, associates the keyword "Twain" 720 with eight distinct item identification numbers, each corresponding to a single book. Inspection of FIG. 7 reveals that the term "Twain" is associated with a book corresponding to item identification code 1311302165. This association between a keyword and a book may come from the word appearing in the book's title, in the author's name, or in ancillary text, such as descriptions and third party reviews of the book.

The Books Popularity Score Table 750 is also indexed by keyword 752. For each keyword 752, the table 750 contains one or more item identifiers 754 analogous to those of the Full Text Index 710. The table also includes, for each keyword-item pair, a "popularity score" 756, the meaning of which is discussed below.

The entries in the Books Popularity Score Table 750 are generated through the actions of users conducting on-line product searches on the web site 130. When a user conducts a search within the host web site 130, the user's search query is stored in the query log 136 shown in FIG. 1. The hypertext links selected by the user following the search are also stored, as are the times at which the selections are made. Through parsing of the query log 136, the user's actions may be followed in great detail. A query log parsing processor (not shown in FIG. 1) extracts the relevant information and generates the popularity scores 756 stored in the Books Popularity Score Table 750. The manner in which this is done, together with more details about using popularity scores to facilitate query searches, is described in the U.S. application Ser. No. 09/041,081, filed Mar. 10, 1998, entitled "Identifying the Items Most Relevant to a Current Query Based on Items Selected in Connection with Similar Queries," which is hereby incorporated by reference.

The popularity scores 756 of the Books Popularity Scores Table 710 reflect the frequency with which users have selected the corresponding item 754 from query results produced from searches containing the corresponding keyword 752 as a query term. For example, FIG. 7 indicates that the item associated with code 2722601080 has been selected by a user one time following a search including the query term "Mark" 760. The item identified with code 4603283881, by comparison, has been selected twenty-two times following searches including the query term "Mark" 760. This latter book has also been selected forty-one times following searches including the query term "Twain" 770.

Different actions by a user may be used to qualify as a "selection" for purposes of determining the popularity score 756. Actions may include, for example, displaying additional information about the item, spending certain amounts of time viewing information about the item, accessing hypertext links within the information about the item, adding the item to a shopping basket, and purchasing the item. All of these actions may be assessed from the query log 136.

Different weightings may be associated with different user activities. In one embodiment, for example, clicking on an item increments the item's popularity score by one while placing the same item in an on-line "shopping cart" increments its popularity score by fifty.

Preferably the popularity scores 756 are determined by the recent actions of users over a predetermined amount of time, such as a week, ensuring that the scores represent current user preferences. Preferably the Books Popularity Score Table 750 is constructed by merging the results of a number of intermediate tables corresponding to user actions over adjacent periods of time. The query log 136 is parsed once per day to generate a daily intermediate table containing keyword-item pairings and corresponding popularity ratings for that day. Each day, a new full table 750 is constructed by merging the new intermediate table with the most recent N intermediate tables, where N is a predetermined number. The parameter N is selected to equal thirteen for all categories. This creates a full table 750 representing results over a "sliding window" in time fourteen days in duration. In another embodiment, the number N is selected to be larger for categories that experience low user traffic (e.g. Classical Music) than for categories that experience high user traffic (e.g. Books).

The popularity scores of the multiple intermediate result tables are weighted equally during the merging into the full table 750. In an alternative embodiment, the popularity scores of the multiple intermediate tables are assigned different weightings for merging, with the weightings depending on the times at which the intermediate tables were created. In one such embodiment, the weightings used for merger decrease with increasing age of the intermediate table.

If a book falls out of fashion, and thus is not selected within the time period stored in the present version of the Books database 141, the book will fail to appear in the associated Books Popularity Score Table 710. If a book has been selected within the relevant time period, it will contain one entry in the table 710 for every query term utilized by users prior to selecting the book over that time period. During a later period the same book may have completely different keyword 712 entries if the users selecting the book utilized different search query terms to find it.

All Products search results from the Books database 141 are prioritized, for purposes of display on the All Products search results page 300, based on the popularity scores 756 of the Books Popularity Score Table 750.

For single-term queries, the search tool 154 prioritizes the search result items based upon each item's popularity score. Referring to FIG. 7, for example, a search of the Books database 141 for the query term "Mark" 760 would prioritize the three items as 4603283881, 9040356769, and 2722601080, as determined by the three popularity scores 22, 7, and 1, respectively.

For multiple-term queries, such as "Mark Twain," the search tool 154 only returns items having entries in the Books Popularity Score Table 750 under both query terms. In FIG. 7, for example, the query "Mark Twain" would trigger a match for item 4603283881, which is present for both query terms, but not for the other items displayed. When multiple items match all of the terms of a multiple-term query, the popularity scores of each term for that item are combined in some manner to create a query phrase popularity score for that item. In one embodiment, the query phrase popularity score is the sum of the popularity scores 756 of the component terms. In other embodiments, discussed later, a more complicated combination of the scores is used.

This prioritization scheme is used to determine the top-level matches that are displayed on the All Products search results page 300. The top-level matches correspond to those items, up to a maximum of three, having the highest popularity scores for the submitted query. For example, in FIG. 3 the three top-level matches 312, 314, 316 under the Books category 310 represent the three highest popularity scores for the search phrase "Mark Twain." Furthermore, the top-level matches are ordered on the All Products search results page 300 based on popularity score. Referring to FIG. 3, the items labeled "Letters from the Earth" 312, "Following the Equator . . . " 314, and "Joan of Arc" 316, had the first, second, and third highest popularity scores, respectively, in the Books database 141 for the submitted search query.

For the Books category 310 of an All Products search, the lower-level matches are accessible from the All Products search results page 300 via a hypertext link 318. This link 318 generates a lower-level Books results page that displays both the top-level search result items and lower-level search result items.

In one embodiment, the lower-level search result items from the Books Popularity Score Table 750 that matched the submitted query are displayed most prominently, followed by search result items found only in the Full Text Index 710. In an alternative embodiment, the lower-level search result items are displayed according to preset categories unrelated to popularity score 756. In one embodiment, for example, the lower-level Books results page may display three separate alphabetized lists: one for books that are immediately available, one for books that must be special ordered, and a third for books that are currently out of print. Preferably the user is provided with the ability to search the Books Full Text Index 710 based on other criteria as well, such as author, title, and ISBN (International Standard Book Number).

The Music, Videos, Software, and Electronics databases 142–146 are structured in the same manner as the Books database 141 shown in FIG. 7. Each category database consists of a Full Text Index, containing comprehensive information about the products within the category, and a Popularity Score Table containing information about recent search and selection activities by users within the category. The Auctions database 144, on the other hand, includes an Auctions Full Text Index but lacks an analog to the Popularity Score Table.

Upon initiation of an All Products search query, the search tool 154 returns a prioritized list of search result items, for each category, using the approach discussed above for the Books category. The top matches from this prioritized list (up to a maximum of three) become the "top-level" matches, for each category, for display in the All Products search results page 300. For these categories 320, 330, 340, 360, 370, as for the Books category 310, lower-level search result items are accessible from the All Products search results page 300 via a hypertext link 328, 338, 348, 368, 378.

There are three special circumstances in which prioritization of one or more of the Books, Music, Video, Software, and Electronics categories is not based on popularity scores. First, when a category is newly introduced it takes some time (e.g. two weeks) for the corresponding Popularity Score Table to accumulate sufficient user selections to result in useful popularity scores. During this "introductory period" the top-level All Products search result items are prioritized using the TFIDF relevancy approach discussed earlier.

The second special circumstance arises when a new product line is introduced within a category. In this situation popularity scores may be plentiful for the category as a whole, but scores for the newly released product line will necessarily be lacking. In order to assist users in finding the new product line during this "transition period," the top-level All Products search result items for that particular category are prioritized using the TFIDF relevancy approach discussed earlier.

The third special circumstance arises when a search query is so unusual that the search tool 154 fails to generate a single match within any of the Popularity Score Tables (or in the Auctions database 144). This circumstance is discussed at length after the following section with the help of FIG. 9.

For some All Products search queries, the search tool 154 may find matches within the Books Popularity Score Table 750, but not within the analogous Music Popularity Score Table. In this case, there are no top-level search results available to display on the All Products search results page 300 for the Music category 340. Indeed, this is what is displayed in FIG. 3. If the search tool 154 finds at least one lower-level result item (i.e. a match in the Music Full Text Index), a hypertext link 348 to the lower-level results is provided on the All Products search results page 300. Inspection of FIG. 3 reveals that this is the case for the Music and Electronics categories 340, 370 in response to the query "Mark Twain." If, on the other hand, no matches are found in either the category's Popularity Score Table or Full Text Index, then the category is omitted entirely from the All Products results page 300.

2. Ranking Categories Based on Relevance

Once the search tool 154 has generated search results from each of the categories, the categories themselves compete for priority for display purposes. These competitions between categories, like the ranking of items within each category, are based upon an assessment of the relevance of the search query to each competitor.

Figure 8:
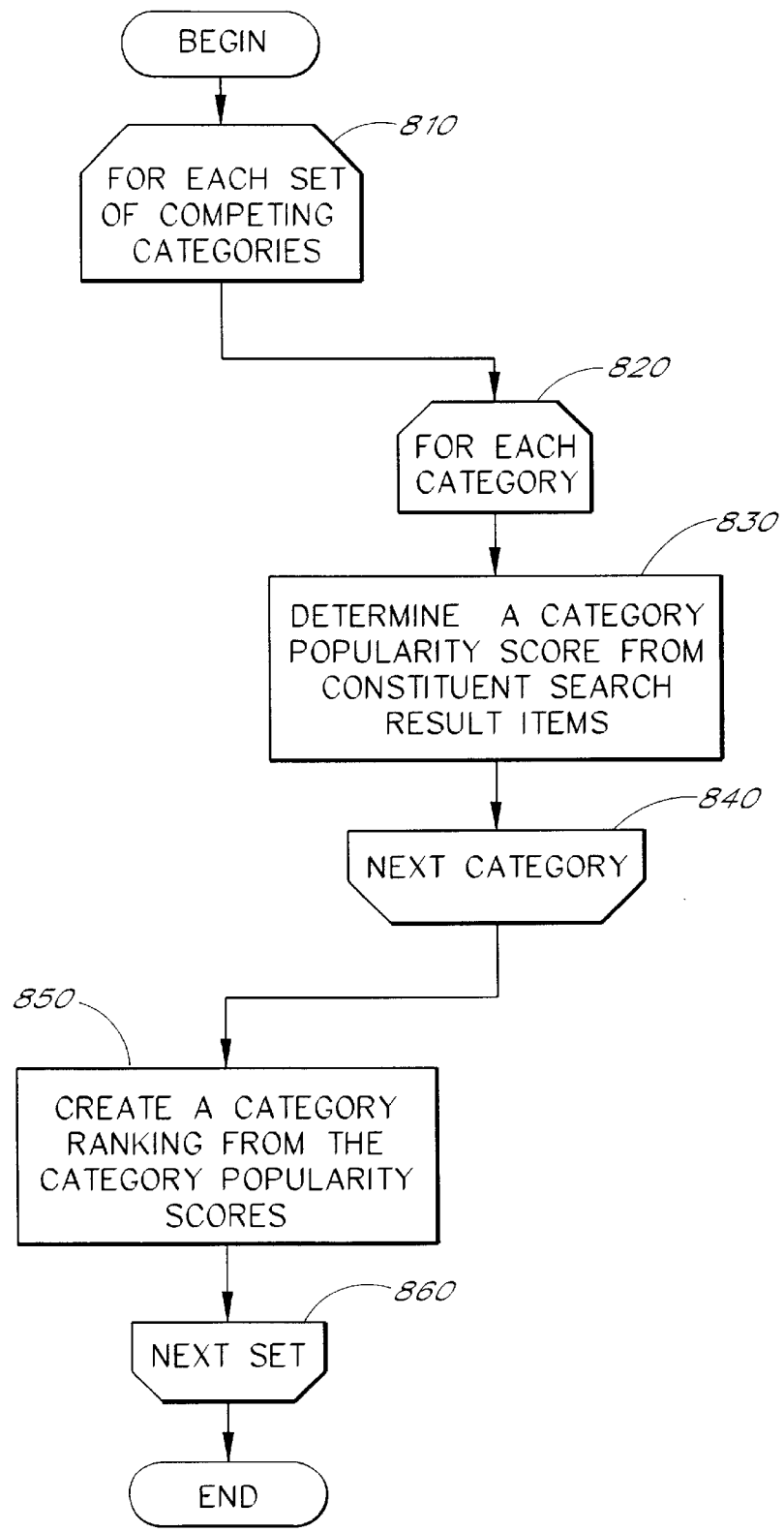
FIG. 8 illustrates the process used to generate a category relevancy ranking for use by the process of FIG. 6.

FIG. 8 illustrates the category ranking process 150 used to generate a category relevancy ranking for each competing category in an All Products search. The categories involved in an All Products search do not all necessarily compete with one another. Rather, the categories may be divided up into a number of "sets." Within each set, the member categories compete for priority for display purposes. Categories from different sets do not compete. Different sets might themselves compete for priority, or their arrangements may be predetermined. In different embodiments, the sets may be grouped into "sets of competing sets," and so on, as needed.

The categories of the host web site 130 are divided, for purposes of an All Products search, into three sets of categories. These sets are most easily seen through inspection of the All Products search results page 300 in FIG. 3. One set consists of categories that compete for priority within the Top Search Results 305 section of the results page 300. Another set consists of categories that compete for priority within the Additional Matches 350 section of the results page 300. A third set consists of a single category, the Product Spider results that are accessible through the Related Products 380 hypertext link.

Referring to FIG. 8, in a first step 810 the query server 140 identifies a first set of competing categories. The query server 140 may identify, for example, the set of categories competing for display space in the Additional Matches 350 section of the All Products search results page 300. These categories are exemplified in FIG. 1 by the Software and Electronics databases 145, 146.

In a second step 820, the query server 140 examines the search results for a first category within the first set. The query server 140 may examine, for example, the top-level search result items for the Software category. The first column of Table IV provides an example of All Products search result items determined from the Software database 144 for the search query "Mark Twain." The search tool 154 determined that the three best top-level Software Category result items are "A Horses Tail," "Extracts from Adam's Diary," and "A Visit to Heaven" (these results are also displayed in FIG. 3). The number in parenthesis adjacent to each item represents the popularity score for that item (see FIG. 7 and associated discussion) for the search query "Mark Twain."

TABLE IV

| Software | Flowers & Gifts | Packaged Travel |
| --- | --- | --- |
| A Horse's Tail (59) | Mark Twain Riverboat (57) | Autumn in the Ozarks (61) |
| Extracts from Adam's Diary (20) | On the Trail of Mark Twain (13) | Bermuda (4) |
| A Visit to Heaven (11) | | Europe - Atlantic Crossing (1) |

In a third step 830, the query server 140 determines a category "popularity" score indicative of the significance of the query term to the category. The category popularity scores are generated from some aspect (e.g., the popularity scores) of the constituent search result items in each category. In one embodiment, the category popularity score is determined by summing the constituent top-level result item popularity scores. Applying this approach to the Software results shown in Table IV leads to a category popularity score of 90 (=59+20+1).

In a fourth step 840, the query server 140 repeats the above examination of the All Products search results for another category within the first set. For example, the second and third columns of Table IV show search results for Flowers & Gifts and Packaged Travel categories (not shown in FIGS. 1 and 3) that compete with the Software category for priority within the Additional Matches 350 section of the All Products search results page 300. Determining category popularity scores using the approach discussed above results in scores of 70 (=57+13) for Flowers & Gifts and 66 (=61+4+1) for Packaged Travel.

After category popularity scores have been determined for all members of the set, a category ranking is created in a fifth step 850 based upon the relative values of those category popularity scores. The rankings are determined through a comparison of each category popularity result. For example, using the category popularity results determined above, the Software (score=90), Flowers & Gifts (score=70), and Packaged Travel (score=66) categories would be ranked first, second, and third, respectively. The categories would be arranged (boxes 660 and 670 in FIG. 6) appropriately based on this ranking. That is, the Software category results would be displayed in the most prominent manner, the Flowers & Gifts category results would be displayed in the next most prominent manner, and the Packaged Travel category results would be displayed in the least prominent manner of the three.

In another embodiment, a set of weighting factors is applied to the set of category popularity scores. Such weighting factors may be used to help or hinder particular categories as desired. For example, if it was decided that during the holiday season the Flowers & Gifts category should be provided a competitive advantage, that category may be given a weighting factor of two, with each of the remaining categories having a weighting factor of one. With such a weighting set, the Software (score=1×90=90), Flowers & Gifts (score=2×70=140), and Packaged Travel (score= 1×66=66) categories would now be ranked second, first, and third, respectively. These weighting factors may be influenced by the profile of the user who submitted the search query. Furthermore, the popularity scores may be influenced by the profile of the user who submits the search query. For example, the complete history of selections made by the user within the host web site 130 may be retained in a database (not shown in FIG. 1). This information may be used to adjust the weightings to further individualize the presentation. If the user has made 90% of her prior purchases on the host web site 130 from the Videos database 143, for example, the Videos category popularity scores may be given greater weight to reflect this individualized history.

In another embodiment, the category popularity score is determined by taking the mean value of the constituent top-level result item popularity scores. Applying this approach to the results shown in Table IV leads to category scores of 30 (=90/3) for Software, 35 (=70/2) for Flowers & Gifts, and 22 (=66/3) for Packaged Travel. Thus, under this approach, the Flowers & Gifts category results would be displayed in the most prominent position.

In another embodiment, the category popularity score is determined by taking the highest value of the constituent top-level result item popularity scores. Applying this approach to the results shown in Table IV leads to category scores of 59 for Software, 57 for Flowers & Gifts, and 61 (=66/3) for Packaged Travel. Thus, under this approach, the Packaged Travel category results would be displayed in the most prominent position.

In still another embodiment, the category popularity score is determined by combining the popularity scores of all matching items found in the category's Popularity Score Table, rather than just the matching items having the three highest popularity scores. Other manners of combining top-level result item popularity scores into category popularity scores will be apparent to those skilled in the art.

Inspection of FIG. 3 reveals that the Software category 360 "won" the competition against the Electronics category 370. This is unsurprising considering that the Electronics category 370 does not include any top-level search result items. This indicates that there were no Electronics search result items with popularity scores for the query "Mark Twain," and the Electronics category popularity score using the above embodiments would equal zero.

Referring to FIG. 8, in a sixth step 860 the query server 140 identifies another set of competing categories and repeats steps two through five 820–850. For example, another set of the host web site 130 consists of those categories competing for display space within the Top Search Results 305 section of the All Products search results page 300. These categories are exemplified in FIG. 1 by the Books, Music, Videos, and Auctions databases 141, 142, 143, 144.

Categories in this set are handled in much the same manner as was discussed above for the categories of the previous set. For the Books, Music, and Videos categories 310, 320, 340, for example, the category popularity scores are determined from the constituent top-level item popularity scores using one of several possible approaches, as discussed above.

A complication arises, however, since the Auctions category uses a completely different approach than the other categories in determining the top-level search result items. In particular, the Auctions database 144 does not include popularity scores. Rather, as is discussed above, the highest priority top-level matching results are determined based on the amount of time remaining for each matching item's auction. The category popularity score for the Auctions category is therefore determined in a manner distinct from the other categories.

In one embodiment, the Auctions category popularity score is determined by summing up the number of matching items found by the search tool 154 for the submitted search query within the Auctions database 144. In another embodiment, the Auctions category popularity score is determined by summing up the number of matching auctions with less than a predetermined amount of time remaining. In yet another embodiment, the Auctions category popularity score is determined by a weighted summation of the number of matching auctions, with the weighting factor for a particular auction determined by the amount of time remaining for that auction. Preferably this weighting factor is inversely proportional to the time remaining for the auction.

In one embodiment, the category popularity scores for all of the categories in a competing set (including the non-Auction categories) are based upon the number of items matching the submitted search query. In another embodiment, the category popularity scores for all of the categories in a set are based upon the fraction of items in the category that match the submitted search query (i.e., the number of items in the category that match the search query divided by the total number of items in the category).

The use of category popularity score weighting factors, discussed above, is preferably used to "normalize" the popularity scores between the Auctions and the other categories. In one embodiment, the Books, Music, Auction, and Videos category 310, 320, 330, 340 popularity scores are weighted equally. In another embodiment, the Auctions category popularity score is given a weighting three times as a large as the scores of the remaining categories. In still another embodiment, the Auctions category popularity score is given a weighting one-third as large as the scores of the remaining categories.

Inspection of FIG. 3 reveals that the Books category 310 is the highest on the All Products search results page 300. This indicates that the Books category 310 "won" the competition against the Videos, Auctions, and Music categories 320, 330, 340.

Although the All Products search results page 300 depicted in FIG. 3 associates rank with vertical location within a section of a web page, there are other ways in which the results of a category may be given greater priority. For example, the web page may indicate priority through the use of a different font size, or a different color, through location within a web page (as in FIG. 3), through location on separate web pages, through "framing," or by display of category relevance scores or ranking (optionally expressed as a percentage, as a number of stars, etc.). Numerous possibilities would be apparent to one skilled in the art.

The final set of categories utilized by the host web site 130 consists of a single category, the Product Spider results. These results are not displayed on the All Products search results page 300, but rather are accessible on the page 300 through the Related Products 380 hypertext link. Since this set consists of only one category, there is no competition between categories, and the relevance ranking process of FIG. 8 is not be followed.

The above discussion describes the category ranking process in the context of searching for product offerings. The process is also applicable to other contexts. For example, a user searching for journal articles may be provided with a top-level search results page with a limited number of items displayed within each of multiple categories. A user searching for court opinions may be provided with results divided into state appellate opinions, federal appellate opinions, etc. A user searching for discussion groups may be provided with a search results page with the items arranged by the age of participants, subject matter of the discussion, etc. A user searching for recipes may be provided with a search results page with the items arranged by food type. A user searching for movie reviews may be provided with a search results page with the items arranged by the nature of the reviewer (syndicated newspaper columnist, amateur reviewer, etc.). Numerous possibilities would be apparent to one skilled in the art.

3. Handling Uncommon Search Queries

For uncommon search queries, the search tool 154 may fail to find matches within the Auctions database 144 or within one or more of the Popularity Score Tables of the other databases 141, 142, 143, 145, 146.

If results are found within the Auctions database 144, the top-level results will preferably be displayed on the All Products search results page 300 regardless of whether any of the other categories have top-level results (i.e., have matching results in the Popularity Score Tables of their product databases). Similarly, as long as at least one of the non-Auction categories finds matches within the category's Popularity Score Table, those top-level results will preferably be displayed on the All Products search results page 300 regardless of whether any other category found top-level results. If no categories find top-level results, the query server 140 does not generate an All Products "no results" page. Instead, the query server 140 undertakes additional steps in an attempt to generate search results from the query for display on the All Products search results page 300. The process used by the query server 140 in this endeavor is illustrated in FIG. 9.

Figure 9:
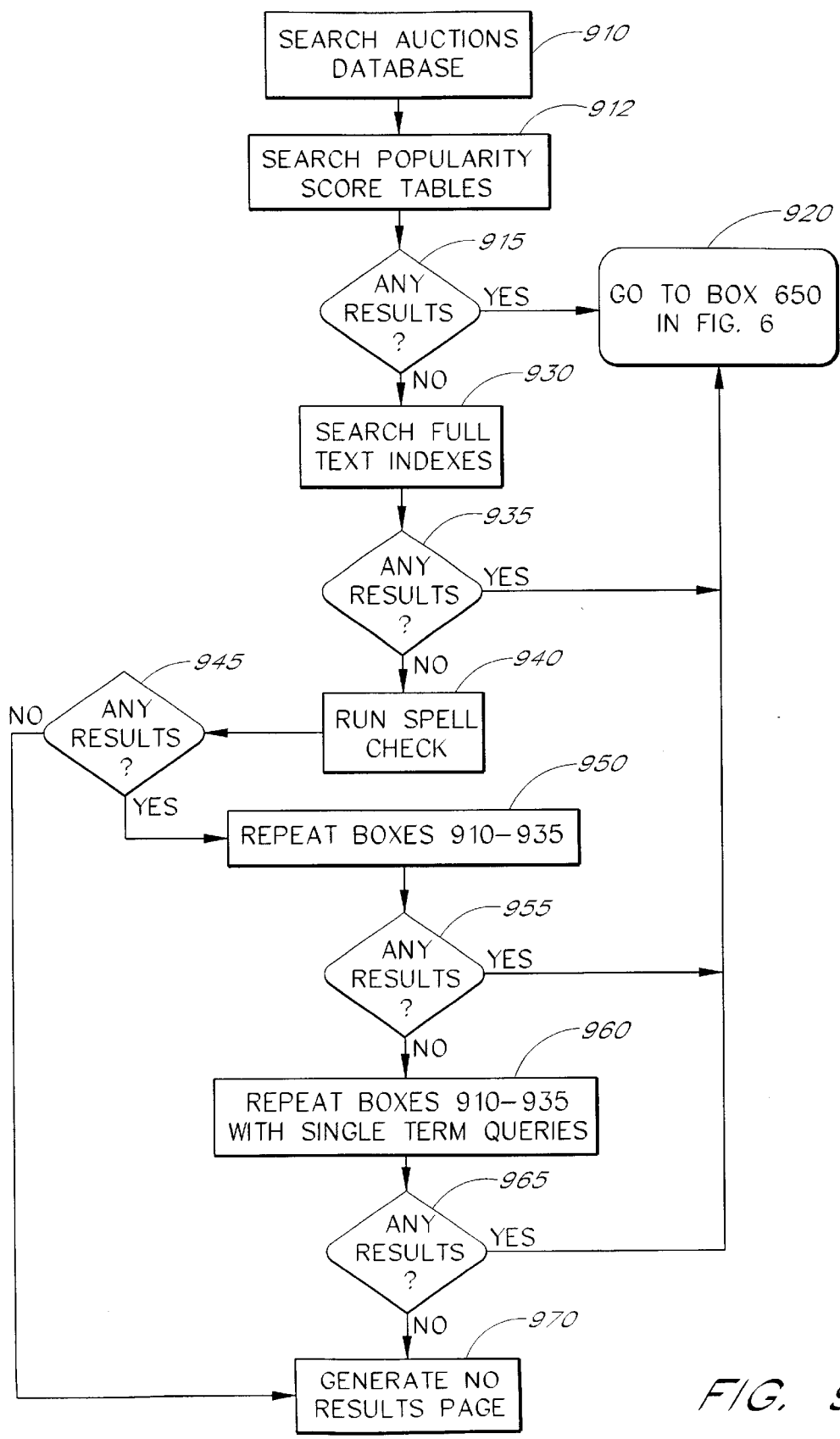
FIG. 9 illustrates the process used to find All Products search results for both common and uncommon search queries.

As represented in FIG. 9, an All Products search begins with a search of the Auctions database 141 (box 910) and a search of the Popularity Score Tables of each of the Books, Music, Videos, Software, and Electronics categories (box 920). This is also represented in FIG. 6 by box 630. The query server 140 determines whether any top-level results are returned from any categories (box 915). If at least one result is returned, the query server 140 jumps to box 650 in FIG. 6 (box 920), and the steps discussed earlier for ranking categories are followed.

If no top-level results are returned as determined by box 915, the search tool 154 conducts a search of the Full Text Indexes of each of the Books, Music, Videos, Software, and Electronics categories (box 930). The query server 140 determines whether any results are returned from any categories (box 925). If at least one result is returned, the query server 140 process jumps to box 650 in FIG. 6 (box 920), eventually resulting in the generation of an All Products search results page 300. In this case, the top-level result items from the Full Text Indexes (preferably up to a maximum of three) are determined by TFIDF relevancy score. In one embodiment the category popularity score for each category returning results is determined from the number of matching items found for that category. In another embodiment the category popularity score is determined by the fraction of items in the category that match the submitted search query (i.e., the number of items in the category that match the search query divided by the total number of items in the category).

If no results are returned as determined by box 935, the spell checker 152 attempts to find misspellings within the submitted search query (box 940). If the spell checker 152 fails to identify any misspelled query terms (box 945), a search "no results page" is generated (box 970), notifying the user of the lack of results for the submitted search query. If the spell checker 152 successfully identifies a potentially misspelled query term (box 945), the spell checker 152 creates a new query phrase by substituting, for the potentially misspelled word, a word found in a dictionary or lookup table. The search tool 154 then repeats the process from boxes 910 through 935, as needed, using the new query phrase (box 950). If the new query phrase generates results as assessed in boxes 915 or 935, the query server 140 jumps to box 650 in FIG. 6 (box 920) and an All Products search results page 300 is generated using the substituted query. The results page 300 notifies the user that the submitted query failed to produce an exact match, and displays the modified query.

If no results are returned for the modified query as determined by box 955, the query server 140 divides the query phrase into multiple single term queries. For example, the submitted four-term query, "Twain Sawyer Becky Thatcher," which will normally only generate results if all four terms are associated with a single item, is divided into four separate one-term queries, "Twain," "Sawyer," "Becky" and "Thatcher." The query processor 140 then repeats the process from boxes 910 through 935, as needed, one time for each one-term query (box 960). Matching result items of the one-term queries compete with one another (e.g., based on popularity score in the Books Popularity Score Table 710) in the same manner as the results within a multiple-term query. In this situation, however, a priority "booster" is added to the popularity scores of result items that match two or more of the search terms. The size of the booster is given by 1,000,000×(N−1), where N is the number of terms matched. Table V illustrates an example of the use of boosters for the four-term search query given above.

TABLE V

| Item: | Matching Terms: | Item-Term Popularity Scores | Multiple Term Booster | Item-Query Popularity Score |
|---|---|---|---|---|
| A | Twain | 3566 | 0 | 3566 |
| B | Twain | 1140 | 1,000,000 | 1,001,332 |
|   | Sawyer | 192 | | |
| C | Twain | 20 | 2,000,000 | 2,000,040 |
|   | Becky | 8 | | |
|   | Thatcher | 12 | | |

Items A, B, and C in Table V match one, two, and three of the query search terms, respectively. Without the use of boosters, Item A would be prioritized first based upon the large popularity score associated with the "Twain"-Item A pairing. Each query term, however, is considered to add discriminating value for the purpose of locating items wanted by the user. Thus the booster is used to elevate those items containing more discriminating information (i.e. more query terms). Item B, which matches two query terms, is given a 1,000,000 booster. Item C, which matches three query terms, is given a 2,000,000 booster. In this way the items that are the closest matches to the full submitted query (Items B and C in this case) are given top priority. Thus the three items of Table V would be displayed on the All Products search results page 300, under the appropriate category, in the order C, B, A, as determined by their respective Item-Query popularity scores.

In order to maintain proper normalization, the same multi-term booster values are used for searches of the Auctions database 141 and the Full Text Indexes of each category.

If any of the one-term queries generate matching results (box 965), the query server 940 jumps to box 650 and an All Products search results page 300 is generated using the multiple one-term queries. The results page 300 notifies the user that the results are merely close matches to the submitted query.

If no results are returned for the multiple one-term queries (box 965), a search "no results page" is generated (box 970), notifying the user of the lack of results for the submitted search query.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

In the claims, which follow, reference characters used to denote process steps are provided for convenience of description only, and not to imply a particular order for performing the steps.

What is claimed is:

1. A method for facilitating searches for web pages that include product offerings, comprising:

for each of a plurality of web pages located by a crawling program: (a) generating a score that indicates a likelihood that the web page includes a product offering, and (b) generating and storing a representation of the web page, including an address of the web page, for subsequently determining whether the web page satisfies a search query;

receiving a search query from a user; and determining whether the search query is satisfied by a web page for which the score generated in (a) satisfies selected criteria;

whereby the need for the user to consider web pages that satisfy the search query but that do not include product offerings is substantially reduced.

2. The method as in claim 1, wherein (b) comprises storing the representation of the web page in a keyword index.

3. The method as in claim 2, wherein (b) further comprises storing the score within the keyword index.

4. The method as in claim 1, wherein (b) is performed only for web pages for which the score satisfies a selected threshold.

5. The method as in claim 1, wherein generating a score comprises applying a set of rules to the web page only, without regard to other pages of a web site to which the web page belongs.

6. The method as in claim 1, wherein generating a score comprises applying a set of rules to the web page and to at least one additional web page of a web site to which the web page belongs.

7. The method as in claim 1, further comprising:

searching one or more product databases to identify a set of products that satisfy the query; and generating and returning to the user a composite search results page which lists at least a set of web pages for which the score satisfies the selected criteria and the set of products.

8. The method as in claim 1, wherein the score is generated based primarily on a computer-implemented analysis of the web page.

9. A product-oriented web search engine system, comprising:

an index that includes representations of web pages that, based on a set of rules, have been determined to within a selected level of confidence to include product offerings; and a query server that uses the index and a query received from a user to identify web pages that both satisfy the query and include product offerings;

whereby the need for the user to consider web pages that satisfy the search query but that do not include product offerings is substantially reduced.

10. The system of claim 9, where the index includes scores that represent probabilities that specific web pages include product offerings, and the query server excludes from consideration web pages with scores that fail to satisfy selected criteria.

11. The system of claim 9, wherein the query server further uses the query to search a database of products that are available from a known merchant.

12. The system of claim 11, wherein the query server generates a composite search results page which lists located products from the database and located web pages with product offerings.

13. The system of claim 9, further comprising a component that applies the set of rules to web pages located by a web crawling program.

14. A method for assisting a user in purchasing a product online, comprising:

(a) receiving a query from the user;

(b) identifying, within one or more databases of products associated with at least one merchant, a set of products that satisfy the query;

(c) identifying a set of web pages that both (i) have been determined to within a selected level of confidence to include product offerings, and (ii) satisfy the query, wherein at least some of the web pages of the set include product offerings from merchants other than the at least one merchant; and (d) generating and returning to the user a search results page which lists at least some of the products and at least some of web pages identified in (b) and (c).

15. The method of claim 14, wherein (b) comprises searching one or more databases of products sold by a host merchant, wherein the host merchant provides a search engine that operates according to claim 14.

16. The method of claim 15, wherein (b) further comprises searching one or more databases of products sold by merchants that are affiliated with the host merchant.

17. The method of claim 14, wherein (c) comprises applying the query to an index in which web pages are classified and/or scored according to a likelihood that each web page includes a product offering.

18. The method of claim 14, further comprising:

identifying a plurality of categories associated with the set of products;

calculating, for each of the plurality of categories, a relevance level of the query to the category; and listing the plurality of categories within the search results page in a display order which is dependent upon the relevance levels.

19. A search engine system for assisting users in purchasing products, comprising:

a first repository that includes representations of products sold by at least one merchant;

a second repository that includes representations of web pages that, based on a set of rules, have been determined to within a selected level of confidence to include product offerings, wherein at least some of the web pages correspond to merchants other than the at least one merchant; and a query server which searches the first and second repositories in response to a query received by a user to identify products sold by the at least one merchant, and web pages with product offerings from additional merchants, that are responsive to the query.

20. The system of claim 19, wherein the second repository comprises a keyword index of the web pages that have been determined to within a selected level of confidence to include product offerings.

21. The system of claim 20, wherein the keyword index includes scores that represent probabilities that specific web pages include product offerings.

22. The system of claim 20, wherein the web pages are classified within the keyword index according to probability of including a product offering.

23. The system of claim 19, wherein the query server generates a composite search results page which lists at least some of the responsive products sold by the at least one merchant and at least some of the responsive web pages with product offerings.

24. The system of claim 23, wherein the composite search results page generated by the query server includes an option for the user to rate the at least one merchant.

25. A method for identifying web pages associated with a search query submitted by a user, wherein web pages that do not provide the opportunity to initiate a product purchase are substantially excluded, comprising:

for each of a plurality of web pages located by a crawling program: (a) generating a score that indicates a likelihood that the web page provides a user the ability to initiate a product purchase, and (b) generating and storing a representation of the web page, including an address of the web page, for subsequently determining whether the web page satisfies a search query;

receiving a search query from a user;

determining whether the search query is satisfied by a web page for which the score generated in (a) satisfies selected criteria; and generating and returning to the user a search results page that identifies a set of web pages for which the score generated in (a) satisfies the selected criteria.

26. A computer-implemented method for facilitating searches for web pages that provide the ability to conduct a desired type of transaction, comprising:

for each of a plurality of web pages located by a crawling program: (a) generating a score that indicates a likelihood that the web page provides the ability to conduct the desired type of transaction, and (b) generating and storing a representation of the web page, including an address of the web page, for subsequently determining whether the web page satisfies a search query;

receiving a search query from a user; and determining whether the search query is satisfied by a web page for which the score generated in (a) satisfies selected criteria;

whereby the need for the user to consider web pages that satisfy the search query but that do not provide the ability to conduct the desired transaction is substantially reduced.

27. The method as in claim 26, wherein the score is generated based primarily on a computer-implemented analysis of the web page.

28. The method as in claim 26, wherein the score is generated by applying a set of rules to the web page only, without regard to other pages of a web site to which the web page belongs.

* * * * *